(12) United States Patent  
Shozaki et al.

(10) Patent No.: US 8,533,290 B2  
(45) Date of Patent: Sep. 10, 2013

(54) INSTALLATION SUPPORT METHOD AND WORKFLOW GENERATION SUPPORT METHOD

(75) Inventors: Toshiya Shozaki, Osaka (JP); Kaitaku Ozawa, Amagasaki (JP); Kenichi Takahashi, Sennan-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1014 days.

(21) Appl. No.: 11/252,812

(22) Filed: Oct. 19, 2005

(65) Prior Publication Data

US 2007/0016902 A1    Jan. 18, 2007

(30) Foreign Application Priority Data

Jul. 13, 2005    (JP) .................................. 2005-204799

(51) Int. Cl.  
*G06F 15/16* (2006.01)
(52) U.S. Cl.  
USPC ........... 709/218; 709/220; 709/221; 709/222; 709/204; 709/205
(58) Field of Classification Search  
USPC .................. 709/220, 221, 222, 204, 205, 218  
See application file for complete search history.

(56) References Cited

U.S. PATENT DOCUMENTS

| | | | |
|---|---|---|---|
| 6,380,951 B1 * | 4/2002 | Petchenkine et al. | 715/736 |
| 6,480,304 B1 * | 11/2002 | Os et al. | 358/474 |
| 6,582,475 B2 | 6/2003 | Graham et al. | |
| 6,636,899 B1 | 10/2003 | Rabb et al. | |
| 6,728,947 B1 * | 4/2004 | Bengston | 717/103 |
| 6,799,314 B2 * | 9/2004 | Beniyama et al. | 717/100 |
| 6,847,466 B1 | 1/2005 | Gazdik et al. | |
| 6,896,426 B2 | 5/2005 | Nakagiri | |
| 7,224,821 B2 * | 5/2007 | Furukawa et al. | 382/112 |
| 2002/0161823 A1 * | 10/2002 | Casati et al. | 709/202 |
| 2004/0064786 A1 * | 4/2004 | Ikeda et al. | 715/500 |
| 2005/0248804 A1 * | 11/2005 | Goel et al. | 358/1.15 |
| 2006/0074730 A1 * | 4/2006 | Shukla et al. | 705/8 |
| 2006/0074736 A1 * | 4/2006 | Shukla et al. | 705/8 |
| 2006/0074737 A1 * | 4/2006 | Shukla et al. | 705/8 |
| 2006/0136490 A1 * | 6/2006 | Aggarwal et al. | 707/103 R |

(Continued)

FOREIGN PATENT DOCUMENTS

| | | | |
|---|---|---|---|
| JP | 5-134854 A | 6/1993 | |
| JP | 6-342443 A | 12/1994 | |

(Continued)

OTHER PUBLICATIONS

Notification of Reasons for Rejection in JP 2005-204799 dated Mar. 25, 2008, and Translation thereof.

(Continued)

*Primary Examiner* — Firmin Backer  
*Assistant Examiner* — Jonathan Bui  
(74) *Attorney, Agent, or Firm* — Buchanan Ingersoll & Rooney PC

(57) ABSTRACT

An installation support method that supports an installation of an application, comprising: a searching step of searching installed applications for an application which is of the same type as a new application to be installed; and a setting step of obtaining configuration values of the application found by the search, and setting initial configuration values of the new application to be the obtained configuration values.

10 Claims, 26 Drawing Sheets

(56) References Cited

U.S. PATENT DOCUMENTS

| | | | | |
|---|---|---|---|---|
| 2006/0221381 A1* | 10/2006 | Morales | ................. | 358/1.15 |
| 2006/0226980 A1* | 10/2006 | Rai et al. | ................. | 340/572.1 |
| 2006/0271927 A1* | 11/2006 | Morales et al. | ................. | 717/171 |

FOREIGN PATENT DOCUMENTS

| | | |
|---|---|---|
| JP | 2001-101106 A | 4/2001 |
| JP | 2001-177531 | 6/2001 |
| JP | 2001-282970 A | 10/2001 |
| JP | 2002-149365 A | 5/2002 |
| JP | 2003-242054 | 8/2003 |
| JP | 2004-058500 A | 2/2004 |
| JP | 2004-118371 | 4/2004 |
| JP | 2004-185079 A | 7/2004 |
| JP | 2004-280726 A | 10/2004 |
| JP | 2005-038244 A | 2/2005 |

OTHER PUBLICATIONS

Notification of Reasons for Refusal, Japanese Application No. 2008-136715, dated Jul. 28, 2009, and English Translation.

* cited by examiner

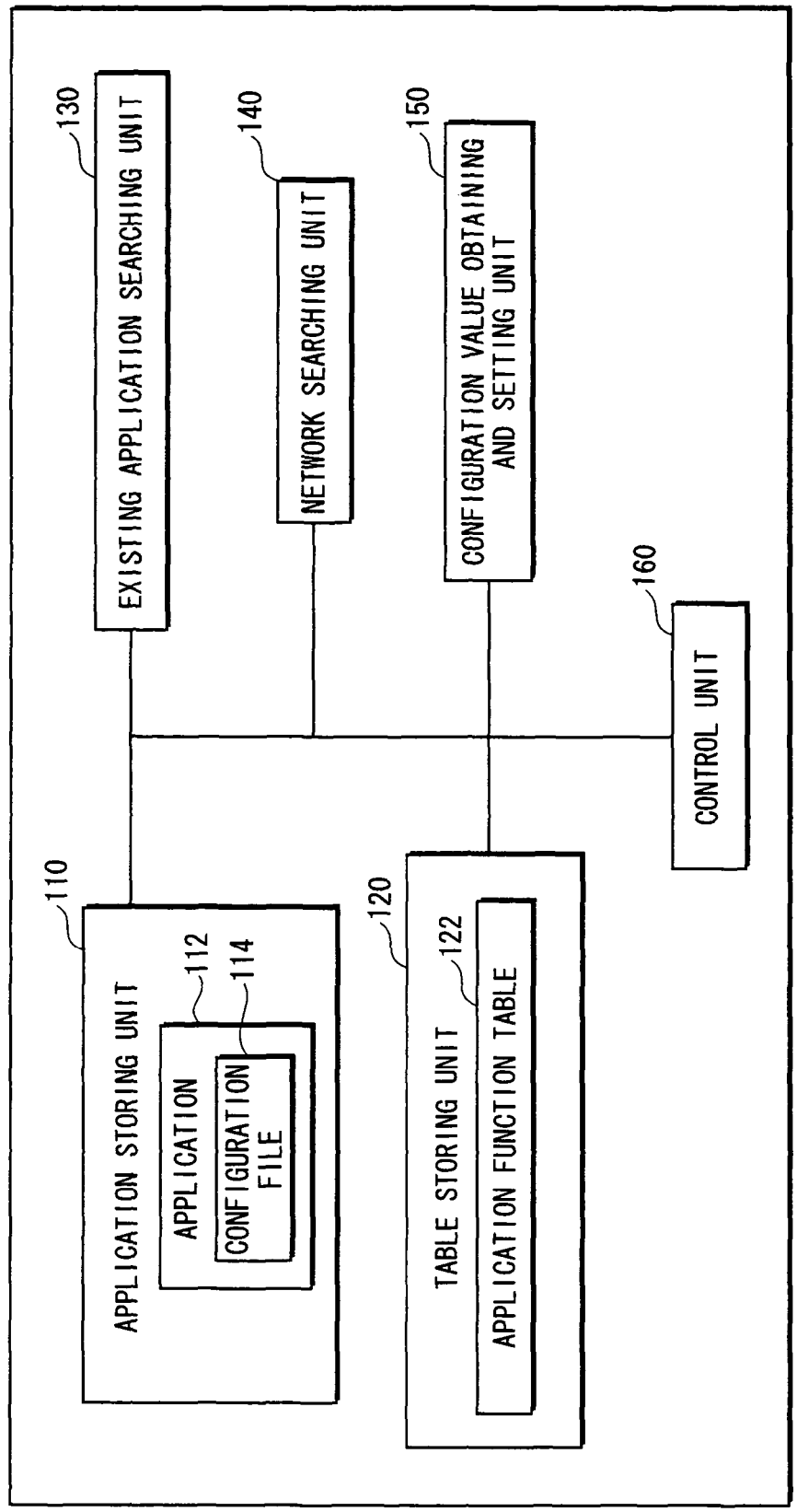

| APPLICATION NAME | CATEGORY | CONFIGURATION ITEM | CONFIGURATION VALUE |
|---|---|---|---|
| BOX UTILITY ver1 | BOX CONFIGURATION | Type | User |
| | | CAPACITY | 5MByte |
| | | NAME | User NAME |
| | | PERIOD OF VALIDITY | 30DAYS |
| | | PASSWORD | 1234 |
| | | DISPLAY | ALL |
| | USER REGISTRATION | PRINT PERMISSION | BW |
| | | FUNCTION RESTRICTION | Print ONLY |
| BOX UTILITY ver2 | BOX CONFIGURATION | Type | User |
| | | CAPACITY | 20MByte |
| | | NAME | User NAME |
| | | PERIOD OF VALIDITY | 10DAYS |
| | | PASSWORD | 2345 |
| | | DISPLAY | User ONLY |
| | USER REGISTRATION | PRINT PERMISSION | Full Color/BW |
| | | FUNCTION RESTRICTION | NONE |
| Bizhub C350 PRINTER DRIVER | | COLOR/BW | COLOR |
| | | BOTH SIDES | ON |
| | | PAGE LAYOUT | 2in1 |
| | | COPIES | 1 |
| | | PAPER FEED TRAY | AUTO |
| | | WATERMARK | SECRET |
| Bizhub C450 PRINTER DRIVER | | COLOR/BW | BW |
| | | BOTH SIDES | OFF |
| | | PAGE LAYOUT | 4in1 |
| | | COPIES | 1 |
| | | PAPER FEED TRAY | AUTO |
| | | WATERMARK | NONE |

| APPLICATION TYPE | APPLICATION NAME | CONFIGURATION FILE PATH | DEVELOPER | MODEL | DEFAULT |
|---|---|---|---|---|---|
| BOX MANAGEMENT | BOX UTILITY ver1 | C:¥ProgramFiles¥BOX··· | KONICA MINOLTA | MODEL A | |
| BOX MANAGEMENT | BOX UTILITY ver2 | C:¥ProgramFiles¥BOX··· | KONICA MINOLTA | MODEL A, B | * |
| USER MANAGEMENT | PSDA ver1 | C:¥ProgramFiles¥USER··· | KONICA MINOLTA | MODEL C | |
| USER MANAGEMENT | PSDA ver2 | C:¥ProgramFiles¥USER··· | KONICA MINOLTA | MODEL C, D | * |
| PRINTER DRIVER | BizhubC350 | C:¥ProgramFiles¥Driver··· | KONICA MINOLTA | BizhubC350 | * |
| PRINTER DRIVER | BizhubC450 | C:¥ProgramFiles¥Driver··· | KONICA MINOLTA | BizhubC450 | |
| DOCUMENT MANAGEMENT | PSW ver1 | C:¥ProgramFiles¥DOC··· | KONICA MINOLTA | MODEL E | * |
| DOCUMENT MANAGEMENT | PSW ver2 | C:¥ProgramFiles¥DOC··· | KONICA MINOLTA | MODEL F | |
| ··· | ··· | ··· | ··· | ··· | ··· |

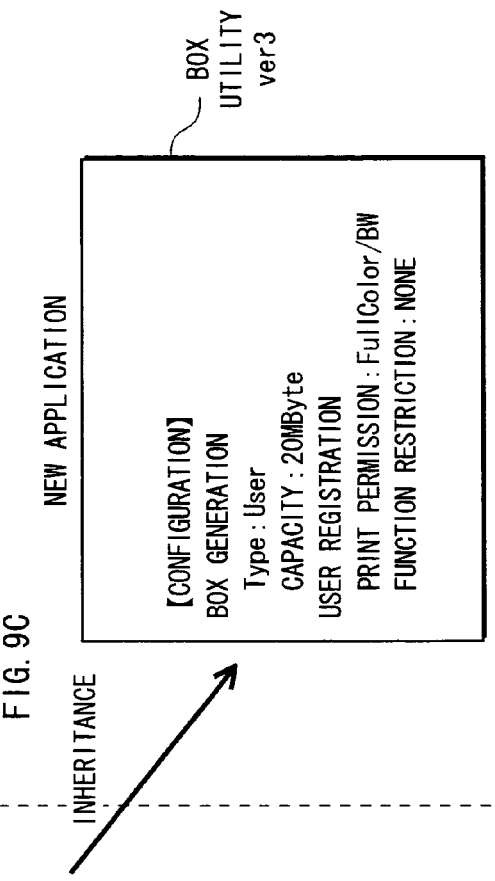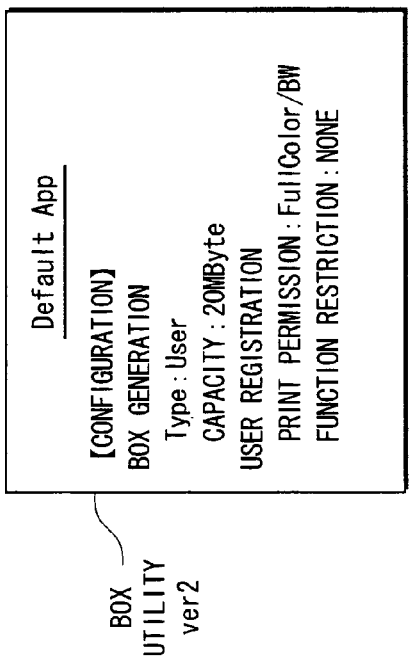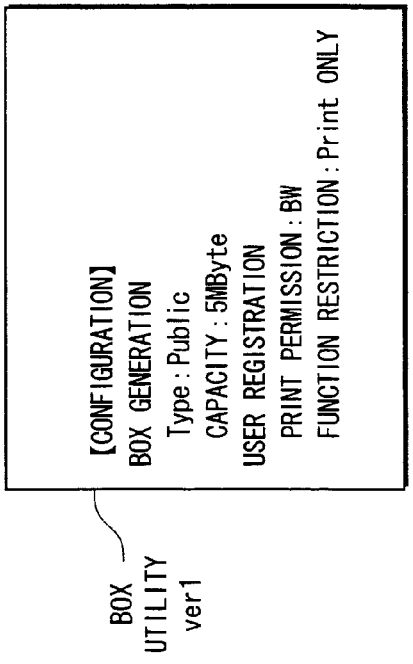

FIG. 12

| APPLICATION NAME | CONFIGURATION ITEM | CONFIGURATION VALUE |
|---|---|---|
| IMAGE PROCESSING APPLICATION A | BACKGROUND REMOVAL | STRONG |
| | CONTRAST | STRONG |
| | COLOR | COLOR SATUATION PRIORITY |
| | SMOOTHING | WEAK |
| | DESKEW | OFF |
| | INVERSION | OFF |
| IMAGE PROCESSING APPLICATION B | BACKGROUND REMOVAL | WEAK |
| | CONTRAST | WEAK |
| | COLOR | COLOR PHASE PRIORITY |
| | SMOOTHING | STRONG |
| | DESKEW | ON |
| | INVERSION | ON |
| FORMAT CONVERTING APPLICATION A | PAGE LAYOUT | ON |
| | CENTERING | ON |
| | PAGE NUMBER | ON |
| | FORMAT | PDF |
| NOTIFYING APPLICATION A | PROTOCOL | Mail |
| | CONDITIONS | PRINT END |
| | DESTINATION | JOB OWNER |
| NOTIFYING APPLICATION B | PROTOCOL | SNMP Trap |
| | CONDITIONS | ERROR |
| | DESTINATION | ADMINISTRATOR |

| APPLICATION TYPE | APPLICATION NAME | CONFIGURATION FILE PATH | MODEL ATTRIBUTE |
|---|---|---|---|
| IMAGE PROCESSING APPLICATION | IMAGE PROCESSING APPLCIATION A | MFPA:¥UserA¥ProgramFiles¥Image… | COLOR MFP |
| IMAGE PROCESSING APPLICATION | IMAGE PROCESSING APPLICATION B | MFPA:¥Public¥ProgramFiles¥Image… | COLOR MFP |
| IMAGE PROCESSING APPLICATION | IMAGE PROCESSING APPLCIATION C | MFPA:¥Public¥ProgramFiles¥Image… | COLOR MFP |
| FILE FORMAT CONVERTING APPLICATION | FILE FORMAT CONVERTING APPLICATION A | MFPA:¥UserB¥ProgramFiles¥File… | COLOR MFP |
| FILE FORMAT CONVERTING APPLICATION | FILE FORMAT CONVERTING APPLICATION B | MFPA:¥Public¥ProgramFiles¥File… | COLOR MFP |
| NOTIFYING APPLICATION | NOTIFYING APPLICATION A | MFPB:¥Public¥ProgramFiles¥Notice… | MONOCHROME MFP |
| NOTIFYING APPLICATION | NOTIFYING APPLICATION B | MFPC:¥Public¥ProgramFiles¥Notice… | COLOR MFP |
| NOTIFYING APPLICATION | NOTIFYING APPLICATION C | Printer:¥Public¥ProgramFiles¥Notice… | PRINTER |
| … | … | … | … |

| CLASSIFICATION NAME | PROCEDURE NAME | DEVICE NAME | PROCEDURE INFORMATION |
|---|---|---|---|
| OCR1 | OCR | PC A | OCR TARGET: SCANNED DATA |
| OCR2 | OCR | MFP A | OCR TARGET: SCANNED DATA |
| BINDING 1 | BINDING | PC A | BINDING TARGET: ¥¥PCA¥aaa.pdf |
| BINDING 2 | BINDING | PC A | BINDING TARGET: ¥¥PCA¥bbb.pdf |
| BINDING 3 | BINDING | MFP A | BINDING TARGET: ¥¥MFPA¥ccc.pdf |
| FILE FORMAT CONVERSION 1 | FORMAT CONVERSION | PC A | FILE FORMAT: COMPACT PDF, OCR EMBEDDING: APPLIED |
| FILE FORMAT CONVERSION 2 | FORMAT CONVERSION | PC A | FILE FORMAT: COMPACT PDF, OCR EMBEDDING: NOT APPLIED |
| FILE FORMAT CONVERSION 3 | FORMAT CONVERSION | PC A | FILE FORMAT: Jpeg |
| TRANSMISSION 1 | TRANSMISSION | — | DESTINATION ¥¥MFPA¥public¥BOXA |
| TRANSMISSION 2 | TRANSMISSION | — | DESTINATION: a-section@km.jp |
| TRANSMISSION 3 | TRANSMISSION | — | DESTINATION: b-section@km.jp |

FIG. 21

| | PROCEDURE NAME | DEVICE NAME | PROCEDURE INFORMATION |
|---|---|---|---|
| NODE 1 | OCR | UNSPECIFIED | OCR TARGET:SCANNED DATA |
| NODE 2 | TRANSMISSION | - | DESTINATION:BOX A |

INSTALLATION SUPPORT METHOD AND WORKFLOW GENERATION SUPPORT METHOD

CROSS-REFERENCE TO RELATED APPLICATION

This application is based on an application No. 2005-204799 filed on Jul. 13, 2005 in Japan, the contents of which is hereby incorporated by reference.

BACKGROUND OF THE INVENTION (1) Field of the Invention

The present invention relates to an installation support method and a workflow generation support method, which can reduce the burden on a user who installs a new application program and generates a new workflow.

(2) Description of the Related Art

In the technical field of document processing devices having functions of a scanner, a copier, a printer, a FAX and so on (e.g. MFP: Multi Function Peripheral), many kinds of application programs (hereinafter simply called "applications") to process documents have been developed in recent years.

Many configuration values are used for configuring such applications, and the user usually customizes the values according to his/her purpose and preference. Such applications are often updated in order to add or improve functions, or to fix bugs.

However, if an update (especially a major update) to the application is installed, the configuration values are usually replaced by the default values of the update.

This means that the configuration values, which the user took a long time to set, are will be reset. To obtain the same configuration, the user has to manually set the configuration values again.

Some users dislike changing the configuration because of the heavy workload of setting the configuration again after finishing the installation. They often use the previous version and avoid installing the update. This hinders the diffusion of the update.

In the case where a new application similar to an application which has been already installed (hereinafter called the "existing application") is installed, it is preferable that the configuration of the existing application is inherited by the new application.

By the way, the inventors of the present invention have been developing a workflow system that performs a plurality of procedures, which are linked together, for processing a document.

To newly generate a workflow used in this system, the user has to define each node constituting the workflow.

Especially, if the workflow is for performing procedures by transferring data among a plurality of devices, the burden on the user increases because the user has to define many items for each node.

SUMMARY OF THE INVENTION

The present invention is made to solve the problem above. The first object of the present invention is to provide an installation support method, by which configuration values set for an existing application are inherited by a new application, and thereby reduce the burden on the user who installs the new application.

The second object of the present invention is to provide a workflow generation support method that can use an existing node definition to complement a definition of a new workflow to be generated, and thereby reduce the burden on the user who generates a new workflow.

The first object is fulfilled by an installation support method that supports an installation of an application, comprising: a searching step of searching installed applications for an application which is of the same type as a new application to be installed; and a setting step of obtaining configuration values of the application found by the search, and setting initial configuration values of the new application to be the obtained configuration values.

With the stated structure, the initial configuration values of the new application become the same as the configuration values of the installed application. Accordingly, the user can use the new application with the setting that is similar to the accustomed setting from the beginning. This means that the workload required for reconfiguring the application is reduced.

The installation support method may further comprise a selecting step of, if a plurality of applications are found by the search, selecting one of the applications, wherein the setting step obtains the configuration values of the selected application.

Each installed application may have priority information given by a user, and the selecting step may use the priority information to select the one of the applications.

With the stated structure, the method can select the application having the highest priority, which has been used as a default application before the new application is installed. This enables the user to use the accustomed setting after the new application is installed.

Each installed application may have version information, and the selecting step may preferentially select a latest version from the found applications.

With the stated structure, the method can select the latest version, which has been presumably used by the user on a routine basis. This enables the user to use the accustomed setting after the new application is installed. Also, the configuration items for the latest version are presumably similar to those of the new application. Therefore, many configuration values can be inherited by the new application.

The new application may be installed in a first information processing device, the first information processing device may be connected to a second information processing device via a network, the installed applications may be in the second information processing device, and the searching step may search for the application from the installed applications in the second information processing device.

The application installed in the second information processing device in a LAN of an office or the like is usually shared by colleagues, and the configuration of the application set by the colleagues is often similar to the configuration that the user wishes to use with the new application. With the stated structure, the number of the configuration values that the user has to set decreases. Accordingly, the user can use the new application without stress from the beginning.

The installed applications and the new application may be device drivers, and the searching step may search for the application that supports the same device as the new application supports.

The searching step may search for a device that exists in the network and is supported by the new application, and may search for the application that supports the found device.

The configuration of the application installed in the device in a LAN of an office or the like is often adjusted so as to suit, for instance, the location where the device is, the object of use, and characteristics of the device. Therefore, the configuration of the installed application is often similar to the configuration that the user of the new application wishes to use. With the stated structure, the adjusted configuration of the installed application is inherited by the new application. This is of benefit to the user.

The installed applications and the new application may be device drivers, and the searching step may search for the application that supports a device whose degree of agreement with a device supported by the new application is high The new application may be a printer driver, the device that the new application supports may be a printer, and the configuration values may relate to a configuration of the printer.

The new application may be utility software relating to a BOX which is a predetermined region allocated in a storing unit of a document processing device, and the configuration values may relate to a configuration of the BOX.

The second object is fulfilled by a workflow generation support method that supports a generation of a workflow including nodes, comprising: a receiving step of receiving, from a user, a definition of a new node which is to be generated; a judging step of judging whether the received definition is complete; a searching step of searching stored nodes which have been previously generated for a node whose definition relates to the new node, if the judging step judges in the negative; and a complementing step of obtaining the definition of the node found by the search, and complementing an incomplete part of the received definition using the obtained definition.

The workflow generation support method may further comprise a selecting step of displaying candidate nodes to the user if a plurality of nodes are found by the search, and receiving an instruction from the user to select one of the candidate nodes.

With the stated structure, the node desired by the user can be generated.

The definition of each node may include a procedure ID relating to the node, and the searching step may search for the node whose procedure ID is the same as the procedure ID of the new node.

The definition of each node may include a procedure ID relating to the node and a device ID used for identifying the device that performs a procedure included in the node, and the judging step may judge that the received definition is incomplete if the device ID is not specified by the user or the device is not capable of performing the procedure.

The user, who wishes to generate a workflow, is interested in what the user can obtain by the specific procedures, such as scanning, faxing, and transmission. However, the user often does not know very much as to which device performs which procedure. With the stated structure, if the device that performs the desired procedure is not specified by the user or the device specified by the user is not appropriate, the definition relating to an appropriate device can be complemented by the method, and the workflow can be generated.

The workflow may be for processing a document while transferring the document among a plurality of devices connected together via a network, the searching step may search for a node whose procedure ID is the same as the procedure ID of the new node, and the complementing step may add, to the definition of the found node, a definition of a transfer node, which is used for transferring the document to the device identified by the device ID.

With the stated structure, the user is not required to add the transmission node by himself, because the transmission node is automatically added by the method to a location where is immediately before the node that includes the predetermined procedure.

The workflow may be generated for processing a document while transferring the document among a plurality of devices connected together via a network, and the judging step may judge that the received definition is incomplete if the definition is not in conformity with a predetermined rule.

The rule can be set by the user. Accordingly, with the stated structure, the user can customize a workflow.

The installation support device according to the present invention is an installation support device that supports an installation of an application, comprising: a searching unit operable to search installed applications for an application which is of the same type as a new application to be installed; and a setting unit operable to obtain configuration values of the application found by the search, and to set initial values of the new application to be the obtained configuration values.

The installation support device may further comprise a selecting unit operable to select one of applications if a plurality of applications are found by the search, wherein the setting unit may obtain the configuration values of the selected application.

The new application may be installed in a first information processing device, the first information processing device may be connected to a second information processing device via a network, the installed applications may be in the second information processing device, and the searching unit may search for the application from the installed applications in the second information processing device.

The installed applications and the new application may be device drivers, and the searching unit may search for the application that supports the same device as the new application supports.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 2 is a functional block diagram of a PC 100;

FIG. 3 shows details of a configuration file 114;

FIG. 4 shows details of an application function table 122;

FIG. 9 is a conceptual diagram showing an example procedure for obtaining configuration values from an existing application and setting the obtained configuration values to a new application;

FIG. 12 is a table showing a list of configuration files;

FIG. 13 shows details of an application function table 282;

FIG. 17 shows details of a node classification table 422;

FIG. 21 shows details of a workflow generated by a user S using an operation panel of a MFP 300;

DESCRIPTION OF THE PREFERRED EMBODIMENTS

The following describes embodiments of the present invention with reference to the drawings.

Figure 1:
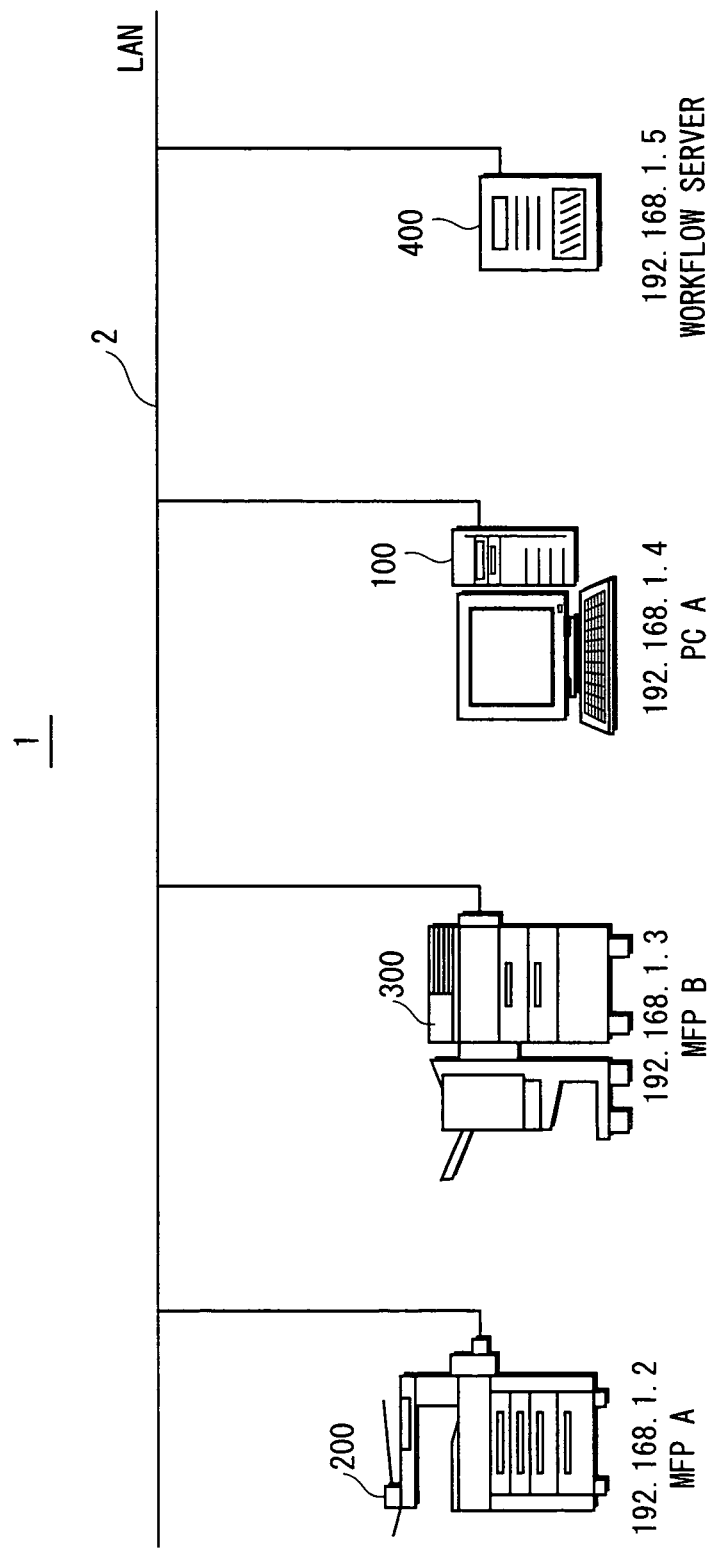
FIG. 1 shows a structure of a workflow system 1.

FIG. 1 shows a structure of a workflow system 1. In the following embodiments, the description is based on this system structure.

The workflow system 1 includes a PC 100 (PC A) as a information processing device, an MFP 200 (MFP A) and an MFP 300 (MFPB) as document processing devices, and a workflow server 400. The devices are connected together via a LAN (Local Area Network) cable 2.

An IP (Internet Protocol) address is assigned to each device, and a name resolution is performed by a DNS (Domain Name System) server, which is not illustrated. In FIG. 1, the names given to the devices are shown under their respective IP addresses.

The first embodiment describes the installation support method for the case where a new application is installed in the PC 100, and the second embodiment describes the installation support method for the case where a new application is installed in the MFP 200. The third embodiment describes a workflow generation support method.

The First Embodiment

<Installation in PC>

The PC 100 and one or more information processing devices (not illustrated in FIG. 1) exist in the LAN.

FIG. 2 is a functional block diagram of the PC 100.

The PC 100 includes an application storing unit 110, a table storing unit 120, an existing application searching unit 130, a network searching unit 140, an obtaining and setting unit 150 and a control unit 160.

The application storing unit 110 stores a group of existing applications 112 that has been installed in the PC 100, and a configuration file 114 containing configuration values set to items used for configuring each application included in the group of applications 112.

The table storing unit 120 stores an application function table 122. The application function table 122 is an index of the group of applications 112 stored in the application storing unit 110.

The existing application searching unit 130 searches the application function table 122 for existing applications of the same type as a newly installed application.

The network searching unit 140 searches the other devices existing within the LAN for the existing applications installed (stored) in the devices.

The obtaining and setting unit 150 obtains configuration values included in the configuration file of an existing application, which is selected from the existing applications found by the existing application searching unit 130 or the network searching unit 140, and set the obtained values as the configuration values for the new application.

The control unit 160 is structured by hardware, such as a CPU, a RAM and a ROM, and controls each unit included in the system.

FIG. 3 shows the details of the configuration file 114. In FIG. 3, the configuration file is assumed to be in a text format for the sake of simplification. However, it may be in a binary format.

The configuration file has four parts, namely "Application Name", "Category", "Configuration Item", and "Configuration Value".

The application "BOX Utility" is utility software installed in the PC 100, and is used for, for instance, newly generating a BOX of MFP and registering a user. The BOX is a specific region on a hard disk or the like, and is allocated to each user.

The category "BOX Configuration" includes items "Type", "Capacity", "Name", "Period of Validity", "Password" and "Display". The category "User Registration" includes items "Print Permission" and "Function Restriction".

The item "Type" is used for defining the attribute of the BOX, and two configuration values, namely "User" (Only for a specific user) and "Public" (Open to public), are available for defining the attribute.

The item "Capacity" is used for setting a storage capacity that is to be allocated to the BOX. The item "Period of Validity" is used for setting a period in which a document is stored in the BOX. The item "Password" is used for setting a password by which the user can access the document stored in the BOX.

The item "Display" is used for setting the method for displaying the BOX, and two configuration values, namely "All" (Showing the BOX to all the users) and "Only for User" (Showing the BOX to only a specific user, and hiding the BOX from the other users), are available for defining the method.

As configuration values used for the item "Print Permission", two values, namely "BW", which permits only a black and white printing, and "Full Color/BW", which permits a full color printing as well, are available.

The application "BizhubC350 Printer Driver" is a printer driver supporting the model "BizhubC350". In the same way, the application "BizhubC450 Printer Driver" supports the model "BizhubC450".

Each configuration item for the printer drivers relates to the way of printing. The item "Color/Black and White" is used for selecting a color printing or a black and white printing. The item "Both Sides" is used for selecting a both sides printing or a one side printing. The item "Layout" is used for laying out a plurality of pages on one sheet. The items "Number of Prints", "Paper Feed Tray" and "Watermark" are further included in the configuration items.

FIG. 4 shows details of an application function table 122.

The application function table 122 has been previously generated by extracting predetermined pieces of information from the application 12, and is stored in the application storing unit 10. Every time a new application is installed in the application storing unit 10, pieces of information relating to the installed application will be registered in the application function table 122.

The application function table 122 includes six parts, namely "Application Type", "Application Name", "Configuration File Path", "Developer", "Model" and "Default".

The part "application Type" is used for categorizing the type of the application, and includes "BOX management", "User Management" (managing users of the MFP), "Printer Driver" and "Document Management" (managing documents stored in the BOX within the MFP).

In this embodiment, applications used for managing peripheral devices of the PC 100 (utility software) and an application for controlling operations of the peripheral devices (a device driver) are described. The former is categorized in "Box Management", "User Management" and "Document Management", and the latter is categorized in "Printer Driver".

The part "Application Name" represents the name of the application.

The part "Configuration File Path" represents a file path showing the location of the configuration file. For instance, the configuration file path of the "BizhubC350" is "C:¥ProgramFiles¥Driver¥konicaminolta¥BizhubC350¥settei.ini".

The part "Developer" represents the developer of the application.

The part "model" represents the model that is supported by the application.

The part "default" represents a priority of the application. The sign "*" (an asterisk) represents that the application has been used as a default application (which is given high priority) among the applications of the same type.

Next, the following describes procedures for setting the configuration values, which are performed by the control unit 160 when a new application is installed in the PC 100.

Figure 5:
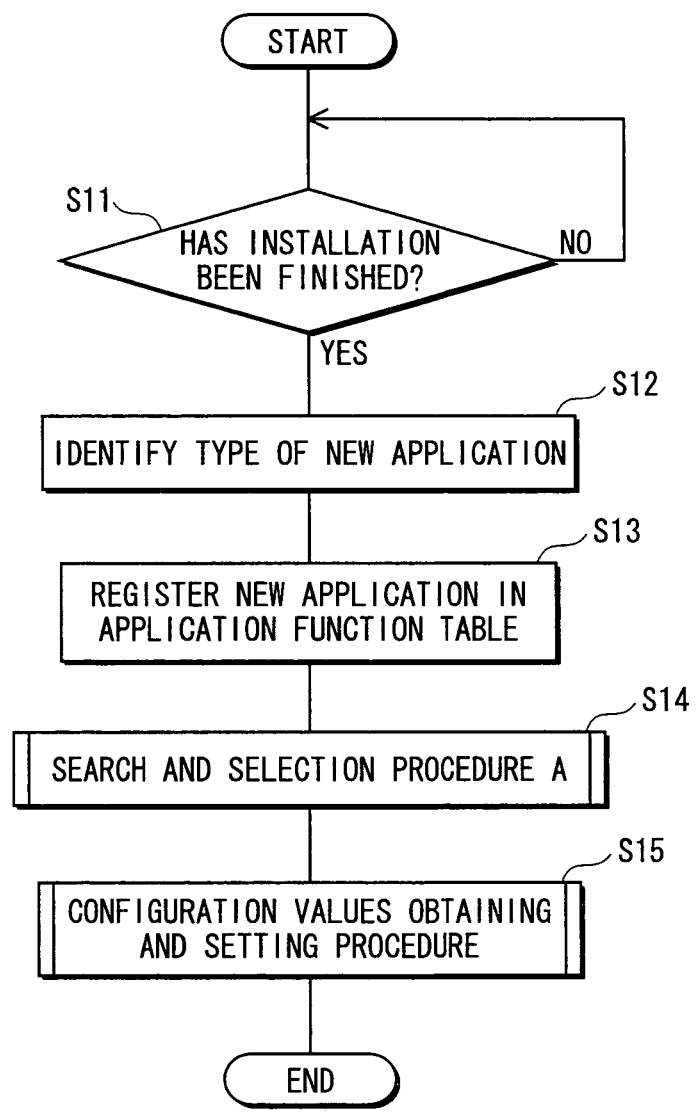
FIG. 5 is a flowchart showing a procedure performed for setting configuration values.

FIG. 5 is a flowchart showing the procedures for setting the configuration values.

If a predetermined application is newly installed (S11), the control unit 160 identifies the type of the newly installed application (hereinafter simply called "the new application") (S12). This identification is performed based on a specific description pattern included in the program of the new application or the application ID code described in the configuration file of the application.

Next, the control unit 160 registers the new application in the application function table 122 (S13). This registration is performed for enriching the application function table 122.

Then, the control unit 160 searches for candidate applications, from which the configuration values may be obtained, from the existing applications, and the processing goes to a search and selection procedure A (S14).

Figure 6:
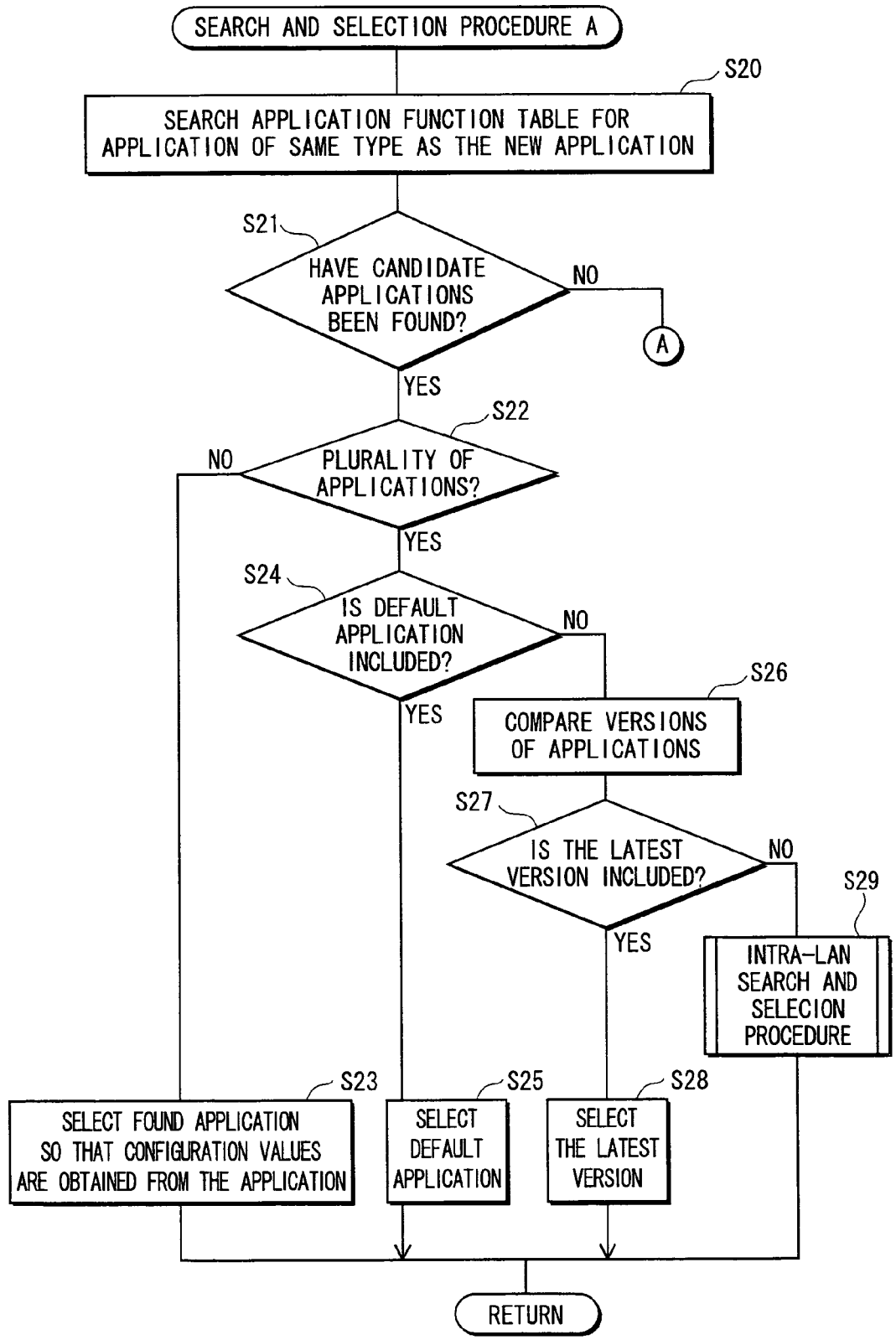
FIG. 6 is a flowchart showing a search and selection procedure A.

FIG. 6 is a flowchart showing the details of the search and selection procedure A.

In the search and selection procedure A, the control unit 160 searches the application function table 122 for existing applications of the same type as the new application (S20). Needless to say, the new application is excluded from the scope of the search.

If only one candidate application is found by the search (S21: YES, S22: NO), the control unit 160 selects the found application so that the configuration values are obtained from the application (S23).

If a plurality of candidate applications are found by the search (S21: YES, S22: YES), the processing goes to Step S24.

In Step S24, the control unit 160 judges whether the default application is included in the existing applications, and if included (S24: YES), the control unit 160 selects the default application as the application from which the configuration values should be obtained (S25).

The reason why the default application is selected as the application from which the configuration values should be obtained is that it is highly possible that the default application has been regularly used by the user and accordingly the configuration values for the application are customized by the user. Therefore, it is beneficial to the user that the customized values are inherited by the new application.

If no default application is included in the existing applications (S24: NO), the processing jumps to Step S26.

In step S26, the control unit 160 compares the versions of the found applications with each other, and if the latest version is included in the found applications (S27: YES), the control unit 160 selects the latest version as the application from which the configuration values should be obtained (S28).

The reason why the latest version is selected as the application from which the configuration values should be obtained is that it is highly possible that the latest version has been regularly used by the user, and the configuration items are similar to those of the new application. Accordingly, it is also highly possible that many configuration values can be inherited by the new application.

In Steps S26 and S27, the versions of the existing applications are compared with each other. However, the version of the new application may be compared with the version of each existing application, and the existing application whose version is closest to the version of the new application may be selected.

If the latest version is not included in the found applications (S27: NO), in other words, if all the found applications have the same version or the version numbers are not discriminable for instance, the processing jumps to an intra-LAN search and selection procedure (S29) which is performed for searching the existing applications installed in the devices existing within the LAN.

Figure 7:
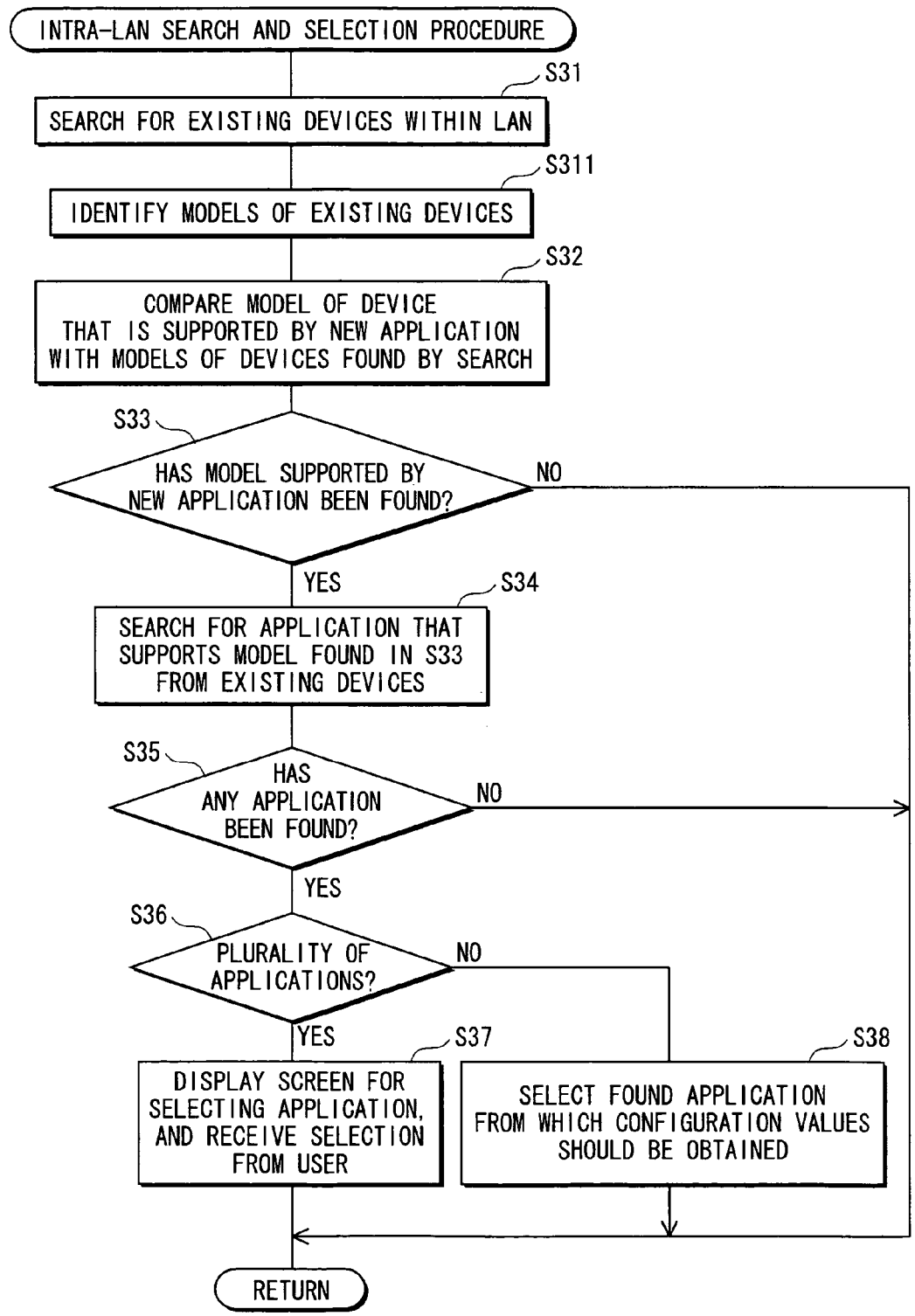
FIG. 7 is a flowchart showing an intra-LAN search and selection procedure performed within a LAN.

FIG. 7 is a flowchart showing the intra-LAN search and selection procedure.

In the intra-LAN search and selection procedure, the control unit 160 searches for existing devices within the LAN (S31).

To perform the search, the control unit 160 firstly transmits predetermined packet data to all the devices existing within the LAN (including the information devices, peripheral devices such as document processing devices, and so on), and confirms the existence of each device based on a response received from the device.

Next, the control unit 160 identifies the models of the existing devices (S311). To perform this identification, a table in which MAC (Media Access Control) addresses of the devices and the models of the devices are associated with each other has been prepared.

Next, the control unit 160 compares the model supported by the new application with the models found by the search which has been performed within the LAN (S32), and judges whether the model supported by the new application is included in the devices existing within the LAN (S33).

If the model supported by the new application is found in the devices existing within the LAN (S33: YES), the control unit 160 searches for an application that supports the found model from the applications installed in the model found in Step S33 (S34).

If only one application is found by the search performed in Step S34 (S35: YES, S36: NO), the control unit 160 selects the found application as the application from which the configuration values should be obtained (S38), and the processing returns to the main routine.

The following describes this procedure more specifically, by assuming that the new application is a printer driver. A model "BizhubC450" is identified in Step S311. If the new printer driver supports the model "BizhubC450" (S32, S33: YES), the control unit 160 searches, from the devices existing within the LAN, existing printer drivers that support the model "BizhubC450" in Step S34. Here, in step S34, the control unit 160 searches only the printer drivers of shared printers exist within the LAN. The usability of the printer sharing function of the printer is generally settable for each printer driver.

A printer existing within a LAN of an office or the like is usually shared by a plurality of users, and the configuration of the printer driver for the printer is often similar to the configuration that the user wishes to use with the new printer (the existing printer driver is possibly used by a colleague of the user). Therefore, if the existing printer driver can be selected, it is beneficial to the user of the new printer driver.

Again, In FIG. 7, if a plurality of applications are found by the search (S35: YES, S36: YES), the control unit 160 displays a list of the found applications from which the configuration values can be obtained on the PC 100, and has the user select an application from the list (S37). Here, instead of performing the Step S37, the application may be automatically selected by comparing the versions of the found applications.

Figure 8:
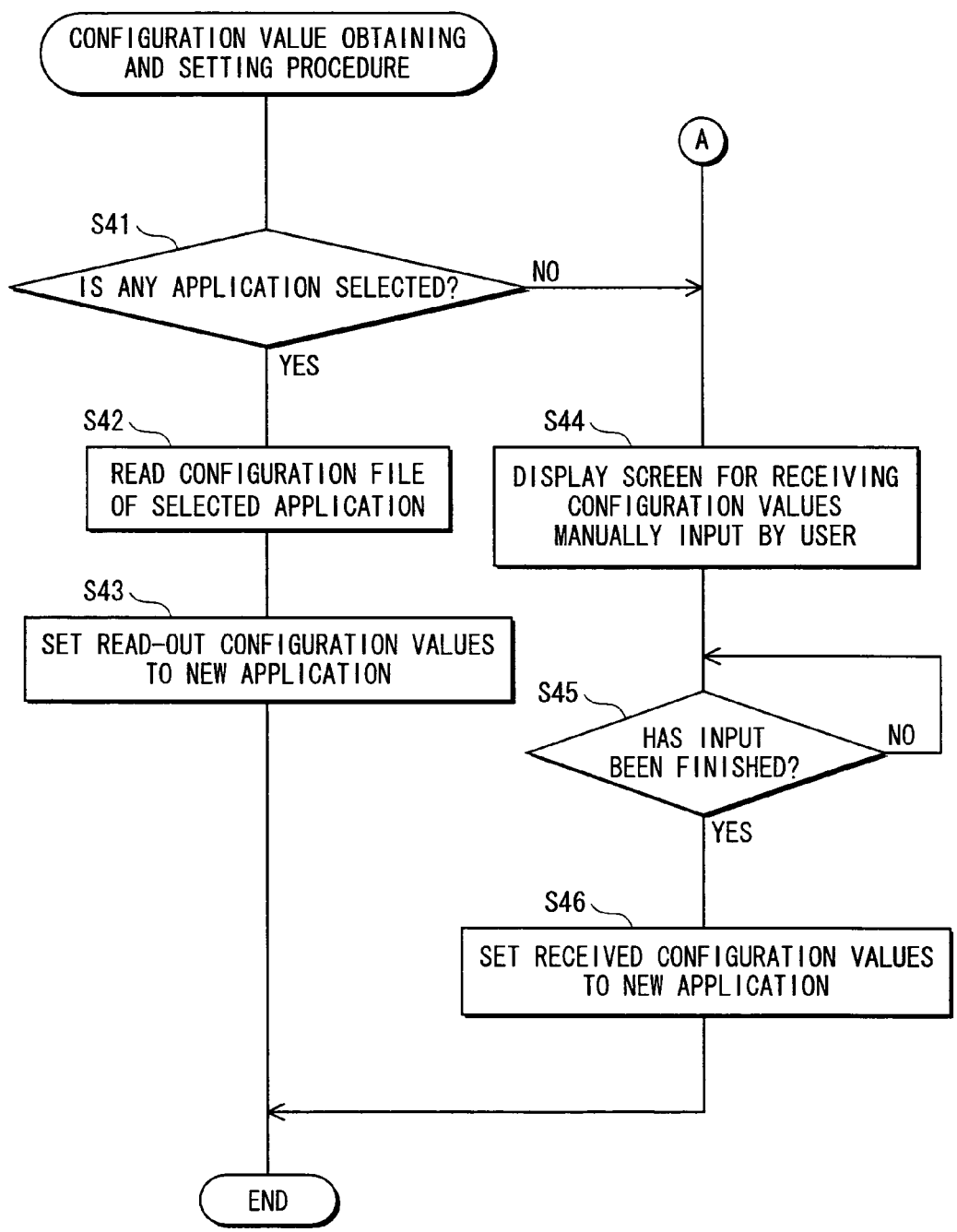
FIG. 8 is a flowchart showing an obtaining and setting procedure for obtaining configuration values from an application selected in a search and selection procedure A, and setting the obtained configuration values to a new application.

FIG. 8 is a flowchart showing the obtaining and setting procedure for obtaining the configuration values from the application selected in the search and selection procedure A, and setting the obtained configuration values to the new application.

If an application is selected by the user (S41: YES), the control unit 160 reads out the configuration values of the selected application (S42). Here, the control unit 160 reads out the configuration items included in the configuration file and the configuration values corresponding to each configuration item.

Next, the control unit 160 sets the read-out configuration values to the new application (S43). More specifically, the control unit 160 rewrites the configuration file of the new application, which is generated when the new application is installed.

If no application is selected (S41: NO), the processing goes to Steps S44 to S46, in which the user manually sets the configuration values. These Steps are prepared for the convenience of the user who has just begun to use the new application. Accordingly, the Steps may be skipped.

Example Procedure for Obtaining and Setting Configuration Values

Next, the procedure for obtaining and setting configuration values is described briefly by taking the BOX utility as an example of the existing application.

FIG. 9 is a conceptual diagram showing an example procedure for obtaining configuration values from the existing application and setting the obtained configuration values to the new application.

As FIG. 9C shows, if a new version of the BOX utility "ver3" is installed in the PC 100, in which the BOX utilities "ver2" and "ver1" have been already installed as existing applications as FIG. 9A and FIG. 9B show, the default application "BOX utility ver2" shown in FIG. 9A is to be selected as the application from which the configuration values should be obtained.

Then, the configuration values of the "BOX utility ver2" will be set to "the BOX utility ver3", which is the new application shown in FIG. 9C, as the initial values.

Accordingly, the user can use the familiar configuration values with the new application from the beginning, because the configuration values of the default application "BOX utility ver2", which have been customized by the user, are inherited by the new application "BOX utility ver3" as the initial configuration values. Therefore, the change of the use environment is not to be caused by the installment of the new application.

The Second Embodiment

<Installation in MFP>

The second embodiment describes the case where the new application is installed in the MFP 200, which is a document processing device (also having a function of an information processing device).

The structure of the second embodiment for obtaining configuration values from the existing application and setting the obtained values to the new application is similar to the structure of the first embodiment. Therefore, the difference is mainly described here.

Figure 10:
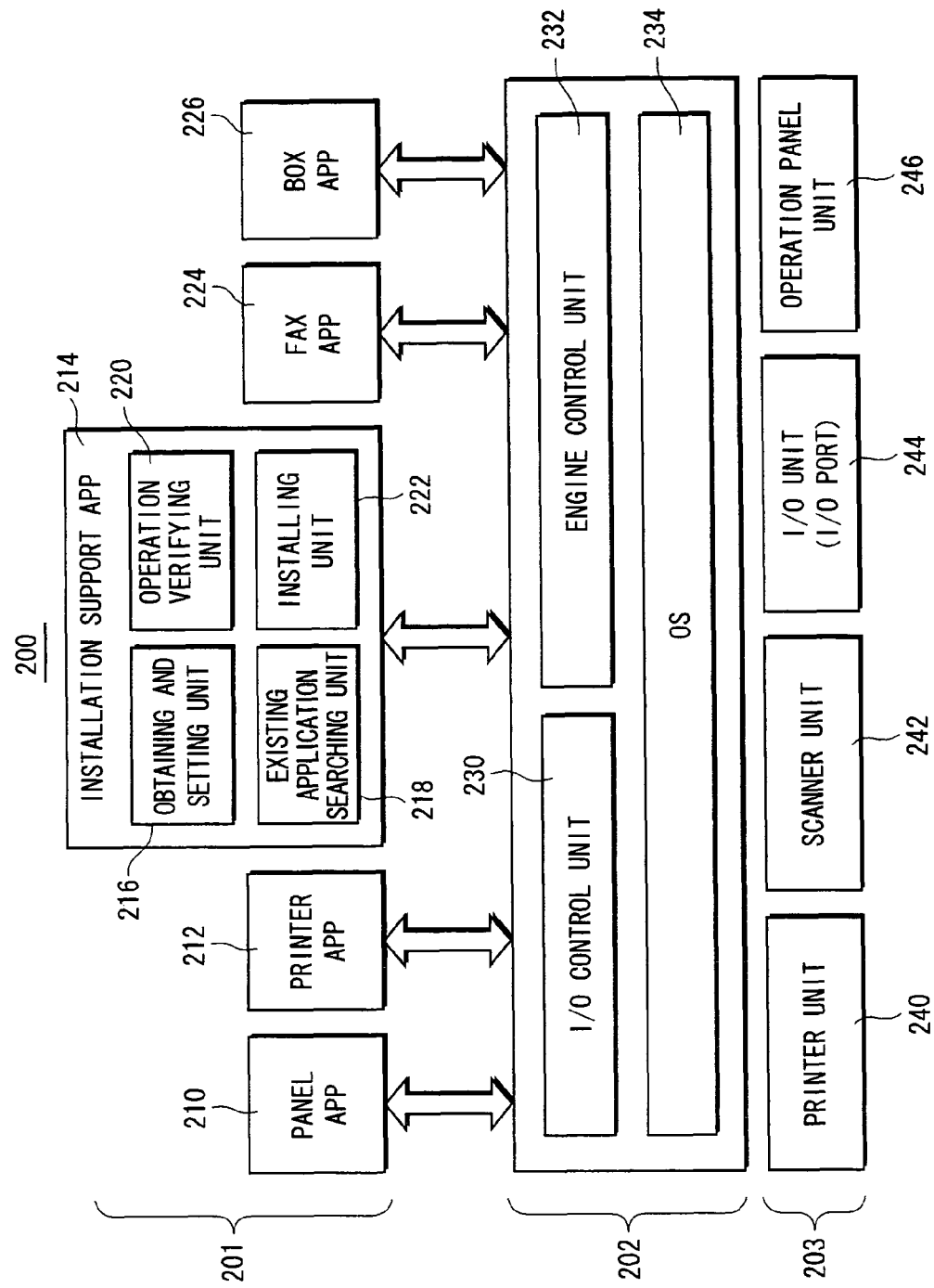
FIG. 10 is a functional block diagram hierarchically showing a structure of an MFP 200 according to the second embodiment.

FIG. 10 is a functional block diagram hierarchically showing the structure of the MFP 200 according to the second embodiment.

The MFP 200 includes a first layer 201 which is at the top level and relates to applications, a second layer 202 which provides an API (Application Program Interface), and a third layer 203 structure by hardware.

The first layer 201 includes a panel APP (Application) 210, a printer APP 212, an install support APP 214, a FAX APP 224 and a BOX APP 226.

The panel APP 210 is an application for managing functions of the operation panel unit 246.

In the same manner, the printer APP 212 is an application relating to functions of the printer unit 240, the FAX APP 224 is an application relating to FAX functions, and the BOX APP 226 is an application relating to functions of the BOX.

The install support APP 214 includes an obtaining and setting unit 216, an existing application searching unit 218, an operation verifying unit 220, and an installing unit 222.

The obtaining and setting unit 216 obtains configuration values from the selected application, and applies the obtained values to the new application.

The existing application searching unit 218 searches the existing applications for an application of the same type as the new application.

The operation verifying unit 220 verifies that the new application operates properly after the configuration values for the found existing application are applied to the new application.

The installing unit 222 performs the installation of the new application.

The second layer 202 includes an I/O control unit 230, an engine control unit 232 and an OS 234.

The I/O (Input/Output) control unit 230 controls an input and an output of the data between functional blocks.

The engine control unit 232 controls the operation performed by each functional block.

The OS 234 performs basic functions, such as providing API to applications, the hardware management, the memory management, and so on.

The third layer 203 includes a printer unit 240, a scanner unit 242, an I/O unit 244 and an operation panel unit 246.

The printer unit 240 prints characters and images on a sheet.

The scanner unit 242 scans images on the document, and digitizes the images.

The I/O unit 244 is an input/output port of the MFP 200, and more specifically, it includes a USB (Universal Serial Bus), an IEEE1394, and so on.

The operation panel unit 246 includes a display panel and a buttons used for receiving instruction from the user, and a touch-sensitive panel.

Figure 11:
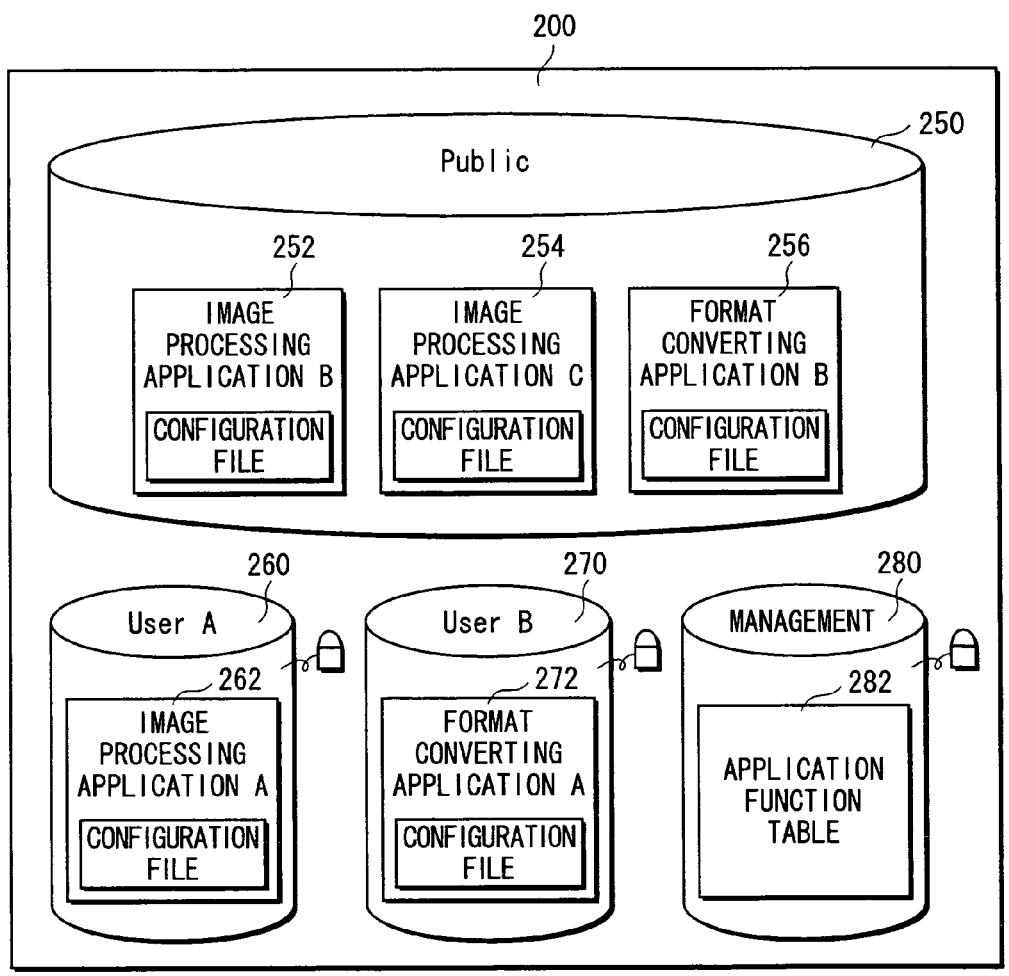
FIG. 11 is a functional block diagram focusing on a storage function of an MFP 200.

FIG. 11 is a functional block diagram focusing on a storage function of the MFP 200.

The MFP 200 includes functional blocks relating to the storage function, namely a BOX (Public) 250, a BOX (User A) 260, a BOX (User B) 270 and a management BOX 280.

Each of the BOX 250, the BOX 260, the BOX 270 and the BOX 280 is a directory to which a region on a HDD (Hard Disk Drive) having a predetermined size is allocated.

The BOX 250 is a shared BOX which is open to all users of the MFP 200, and stores an image processing application B252, an image processing application C254 and a format converting application B256. Each application has a configuration file associated with the application.

Each of the BOX 260 and BOX 270 is a box only for a specific user (a private BOX), and requires an authentication using a password or the like to access data inside the BOX.

The management BOX 280 is a BOX for storing data used for managing BOX functions and so on, and stores an application function table 282.

FIG. 12 is a table showing a list of configuration files of the applications, and corresponds to FIG. 3 of the first embodiment.

The "image processing application" is used for processing the image data scanned by the scanner unit 242, and has configurations items, namely "background removal", "contrast", "color", "smoothing", "deskew" and "inversion".

Each of the items "background removal", "contrast" and "smoothing" has values "strong" and "week".

The item "color" has values "color saturation priority" and "color phase priority".

Each of the items "deskew" and "inversion" has values "on" and "off".

The format converting application is used for change the format of an image, and has configuration items, namely "page layout", "centering", "page number", and "format".

A notifying application is included in each of the MFPB, the MFPC and the printer, and is used for notifying external devices of the progress of the procedure performed by each device. The notifying application has configuration items "protocol", "conditions", and "destination".

The item "protocol" represents the protocol used for the notification, and has values "Mail" and "SNMP (Simple Network Management Protocol) Trap".

If the value "Mail" is set, the notification is performed by transmitting a mail using a mailer which the MFP 200 includes.

FIG. 13 shows details of the application function table 282, and corresponds to FIG. 4 of the first embodiment.

The application function table 282 is stored in MFP 200. Every time a new application is installed in the MFP 200, a new entry is added into the application function table. The added entry is notified to the MFP 300 at the same time, and then, the application function table of the MFP 300 is updated as well. Accordingly, the same application table is stored in the MFP 200 and the MFP 300.

The application function table 282 includes items "application type", "application name", "configuration file path" and "model attribute".

The item "configuration file path" represents where the configuration file is. For instance, "MFP A:¥UserA . . . " represents that the MFP 200 exists in the BOX 260 of the MFP 200.

The item "model attribute" represents the model attribute.

Figure 14:
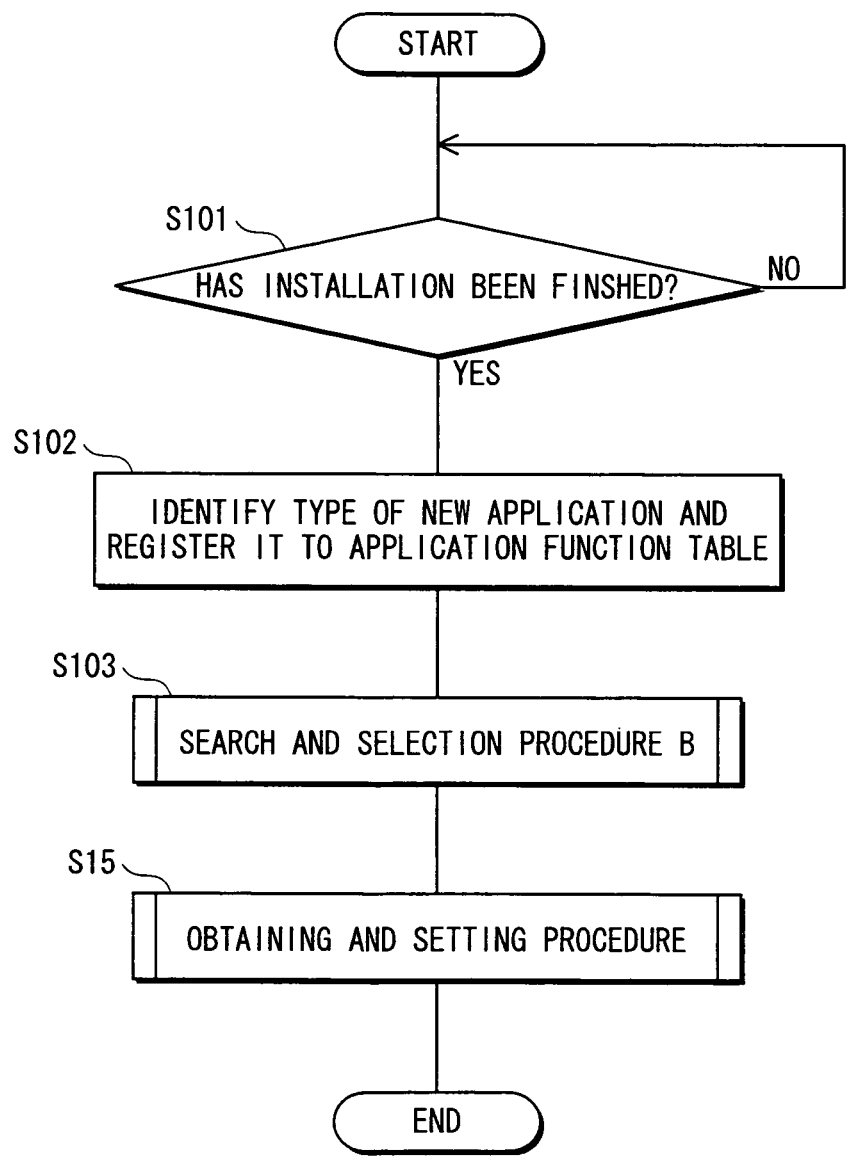
FIG. 14 is a flowchart showing a procedure for setting configuration values according to the second embodiment.

FIG. 14 is a flowchart showing a procedure for setting the configuration values according to the second embodiment.

When the installation finishes (S101:YES), the control unit 160 identifies the type of the installed new application, and register the new application in the application function table 282 (S102).

Then, Step S103 of the search and selection procedure B is performed for searching the existing applications and selecting an application from which the configuration values should be obtained. The obtaining and setting procedure (S15) performed after the search and selection procedure B is the same as the procedure described with reference to FIG. 8, and therefore it is not described here.

Figure 15:
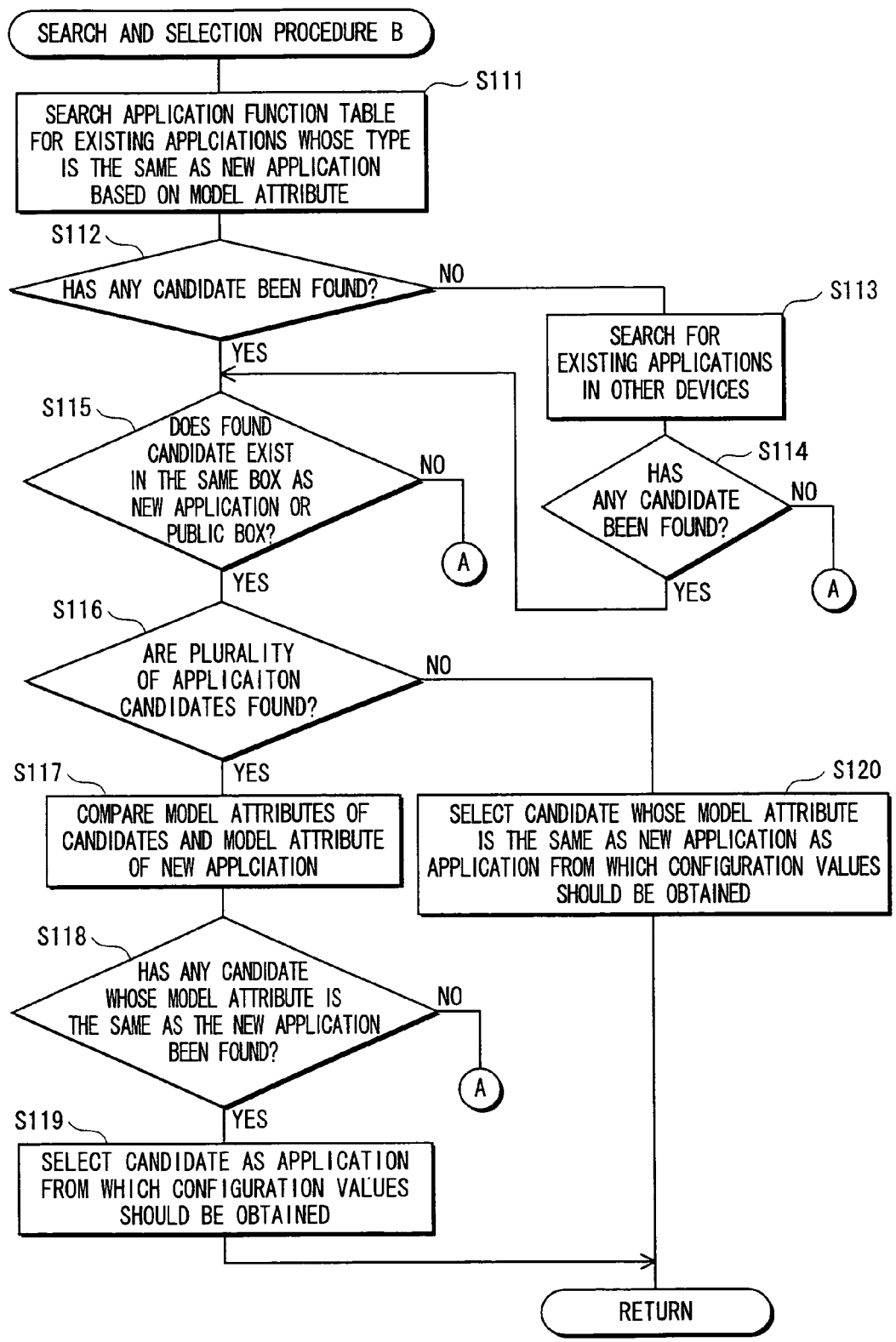
FIG. 15 is a flowchart showing a search and selection procedure B.

FIG. 15 is a flowchart showing a search and selection procedure B.

In the search and selection procedure B, the control unit 160 searches the application function table 282 for the existing application whose type is the same as the new application based on the identified model attribute (S111).

If no such an application is found by the search, the control unit 160 searches for the existing applications in the other devices (S112: NO, S113).

If the existing application is found by the search (S112: YES, or S114: YES), the control unit 160 judges whether or not the location of the found application is in the same BOX as the new application or the Public BOX (S115), and if the control unit 160 judges in the negative (S115: NO), the application from which the configuration values should be obtained is not to be selected, and the processing goes to Steps S44 to 46 (see FIG. 8) in which the configuration values are manually set by the user.

Here, "the same BOX as the new application" means the BOX where the new application is installed.

In Step S115, the reason why the judgement is performed is because if the configuration values of an application in a private BOX of other user are allowed to be inherited, it enables the new user to see the configuration of the other user. This is a problem in the viewpoint of security.

If a plurality of the existing applications are found by the search (S116:YES), the control unit 160 compares the model attributes of the existing applications and the model attribute of the new application (S117). If the model attribute of any of the existing applications is the same as the model attribute of the new application (S118: YES), the control unit set the application as the application from which the configuration values should be obtained (S119).

As described above, with the structure described in the second embodiment, the configuration of the existing application can be inherited even in the case where the new application is installed in the MFP 200.

Generally, an MFP has only a small display screen compared with a PC, and an input unit of the MFP, such as a touch-sensitive panel, is not suitable for keying quickly. Accordingly, the workload of the user for setting the configuration values is generally heavy. Therefore, it is preferable that the present invention is applied.

The Third Embodiment

The object of the workflow generation support unit according to the third embodiment is to lighten the workload of the user who newly generates a workflow. This is realized by complementing the new workflow using already existing workflows.

The workflows relating to the third embodiment are used for performing a series of procedures for processing a document (a document file) by transferring the document among plurality of devices.

Figure 16:
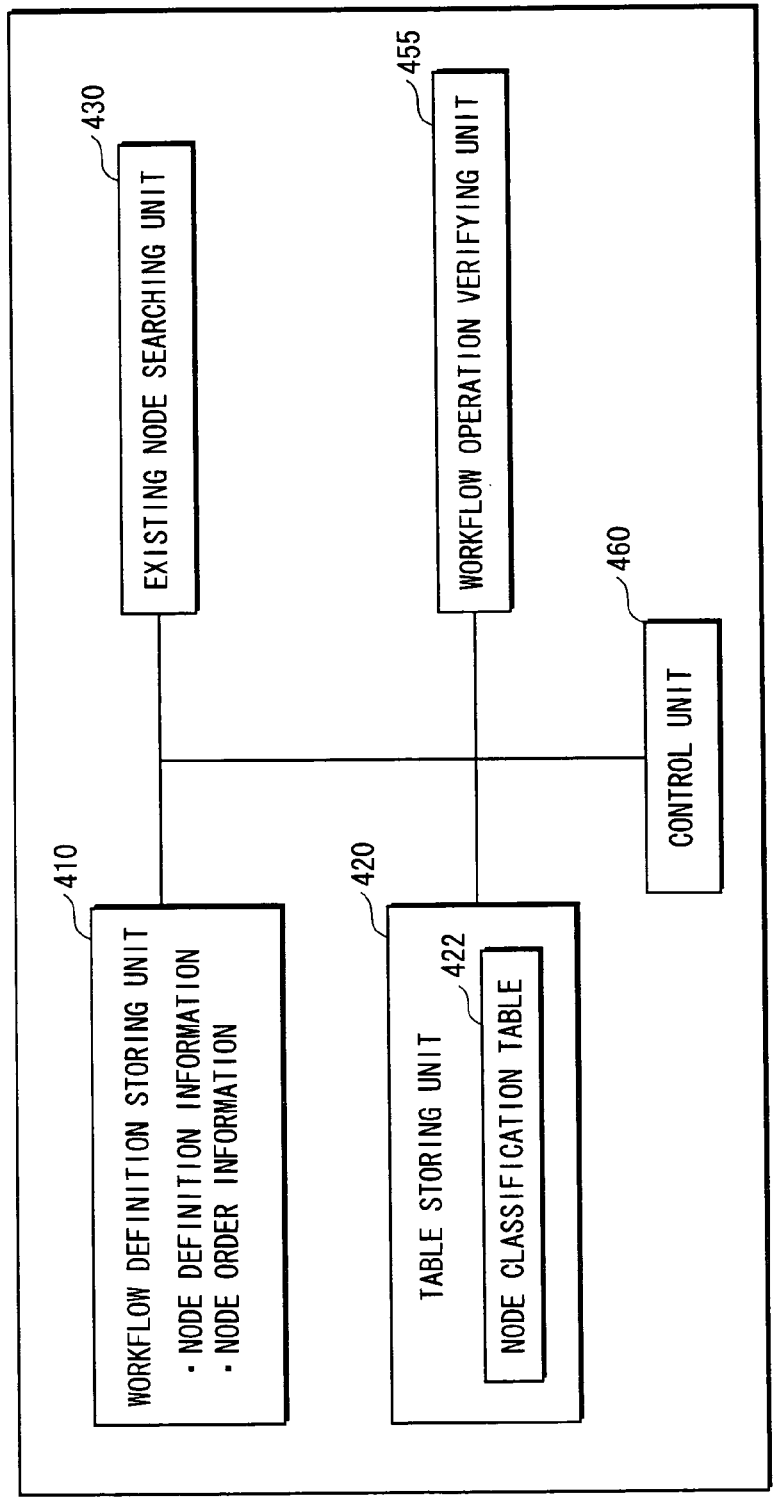
FIG. 16 is a functional block diagram of a workflow server 400.

FIG. 16 is a functional block diagram of a workflow server 400.

The following is a general explanation of the workflow server 400. The workflow server 400 is a server for collectively managing the workflows performed by devices existing in the LAN. The workflow server 400 transmits predetermined instructions to each device, and hardware (e.g. a scanner and a FAX) starts the operation and an application starts up according to the instructions. The hardware and the application perform operations defined by the workflow stored in the workflow server 400. The workflow server 400 stores information as to the procedures performable by each device, for instance by storing a table in which each device in the LAN and the procedures performable by the device is associated with each other. Furthermore, if a device except for the workflow server 400 is used for generating a new workflow, the workflow server 400 will be in a session status, in which the workflow server 400 transmits and receives predetermined data to and from the device, and the workflow server 400 supports the device for generating the new workflow.

The workflow server 400 includes a workflow definition storing unit 410, a table storing unit 420, an existing node searching unit 430, a workflow operation verifying unit 455 and a control unit 460.

The workflow definition storing unit 410 is a functional block that stores definitions of workflows generated based on the instructions input by the user. The workflow definition storing unit 410 stores node definition information and node order information.

The node definition information includes, for each node, (1) a piece of information for specifying procedures to be performed, (2) a piece of information for specifying device that performs the specified procedures, and (3) a piece of information relating to the procedures (procedure information).

The node order information specifies the order of the defined nodes.

The workflow may contain branches, merger points, and loops of nodes. However, for the sake of the simplification, the nodes included in the workflow of the third embodiment are linearly connected.

The table storing unit 420 stores anode classification table 422. The node classification table 422 is an index of node definition information stored in the workflow definition storing unit 410. The index is generated by classification based on the type of the procedures.

If the node definition received from the user is judged to be incomplete, the existing node searching unit 430 searches the node classification table 422 for existing nodes including similar procedures to the node that is incomplete.

The workflow operation verifying unit 455 is a functional block for verifying operations included in a workflow. The workflow operation verifying unit 455 judges (1) whether the definition of each node is complete and (2) whether there is a conflict between the nodes whose orders have been specified. Only the nodes which are verified will be newly stored in the workflow definition storing unit 410.

In the check (1), the nodes are determined to be incomplete in the following cases (criteria) (A) to (C):

(A) The case where a part of the node definition information is missing. This is, for instance, the case where a procedure is not performable because the device that should perform the procedure is not specified;

(B) The case where procedures included in the node definition information are not performable. This is, for instance, the case where a procedure that is not performable by a device is assigned to the device; and (C) The case where the node definition information is not in conformity with a predetermined rule. This is, for instance, the case where although the rule declares that document files should be saved in a predetermined file format, the definition information that uses another file format is specified by the user.

FIG. 17 shows details of the node classification table 422.

The node classification table 422 includes items "classification name", "procedure name", "device name" and "procedure information".

The item "procedure name" is a name of a procedure included in the node, and the item "classification name" is a name given to the procedure based on the procedure type.

Regarding the item "procedure name", the procedure "OCR (Optical Character Reader)" is performed for recognizing characters. The procedure "binding" is performed for binding predetermined target data. This is performed for, for instance, adding a cover to a document file. The procedure "format conversion" is performed for converting the format of a document file.

The item "device name" is the name of a device that performs the procedure.

The item "procedure information" is information relating to, for instance, the target of the procedure. As to the procedures "OCR" and "binding", the item "procedure information" represents the target of the procedure. As to the procedure "format conversion", the item "procedure information" represents the file format as the conversion result, and presence or absence of the OCR data in the file. As to the procedure "transmission", the item "procedure information" represents the destination of the transmission.

As described above, the item "device name" is the name of a device that performs the procedure. However, it is not specified for the procedure "transmission", because all the devices have a file forwarding function and a mail transmission function.

Figure 18:
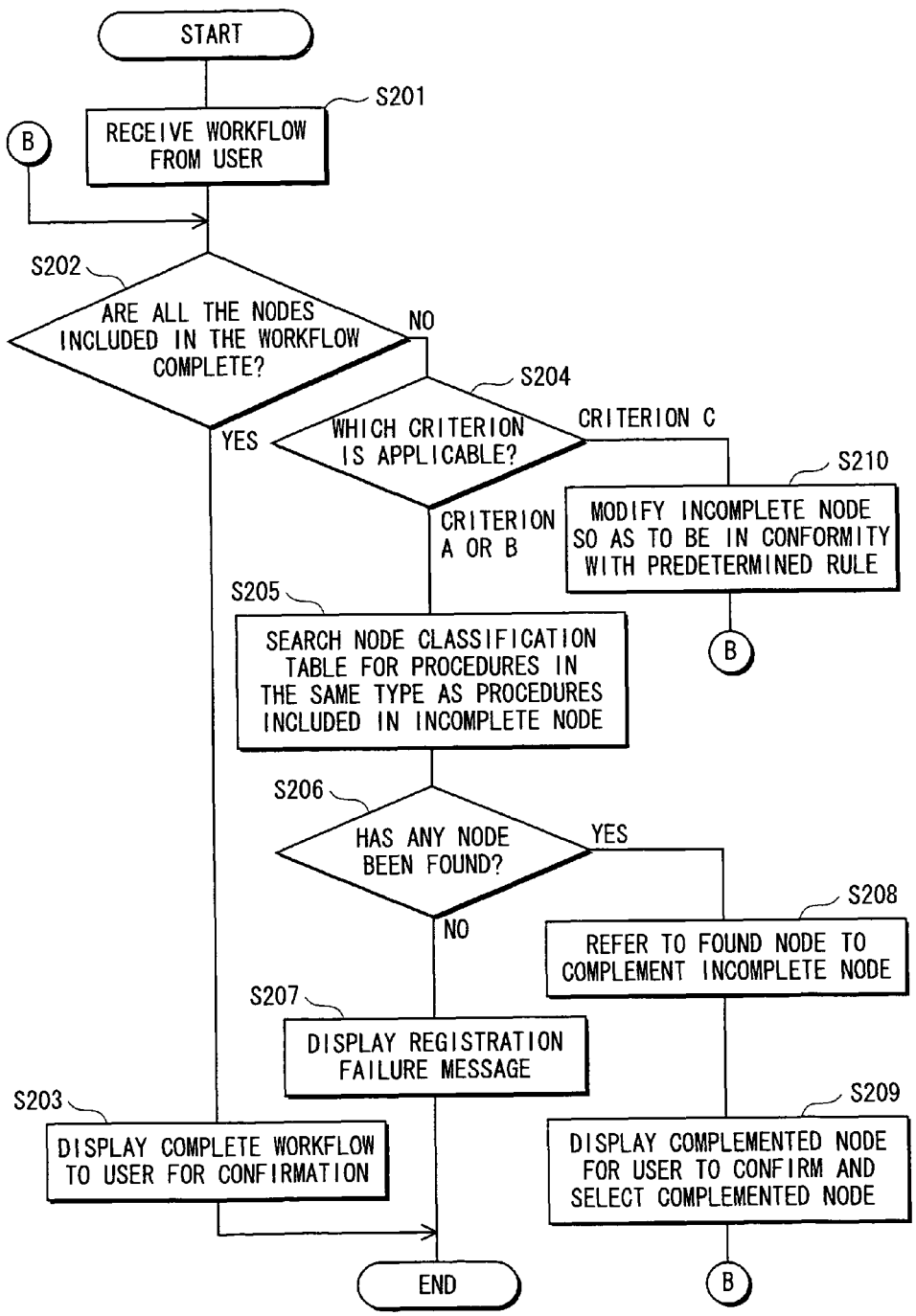
FIG. 18 is a flowchart showing a procedure performed by a workflow server 400 for generating a workflow definition.

FIG. 18 is a flowchart showing a procedure performed by the workflow server 400 for generating a workflow definition.

For generating a workflow, the workflow server 400 receives a workflow from the user (S201). The workflow may be received via a screen displayed on a monitor of the PC 100 connected to the network, or may be received via a screen displayed on the operation panel of the MFP 200 or the MFP 300.

Next, the workflow server 400 judges whether the definition of each node included in the workflow received from the user is complete (S202). This judgement is performed based on the above-described criteria.

If any of the nodes included in the workflow is incomplete (S202: NO), and if the criterion (A) or (B) is true as to the incomplete node (A part of the node definition information is missing or the information includes an error), the workflow server 400 searches the node classification table for a procedure that is of the same type as the procedure included in the incomplete node (S205).

If such a node is found by the search (S206: YES), the workflow server 400 refers to the found existing nodes to complement the incomplete part of the incomplete node (The part due to which the workflow server 400 judges that the node is incomplete) (S208).

Then, the workflow server 400 displays the complemented part to notify the user. If a plurality of existing nodes are found by the search, the workflow server 400 causes the user to chose one from the found nodes.

In Step S204, if the criterion (C) is true as to the incomplete node (The case where the node definition information is not in conformity with the predetermined rule), the workflow server 400 modifies the incomplete node so as to be inconformity with the predetermined rule (S210).

Example of Workflow Generation Support Method

Figure 19:
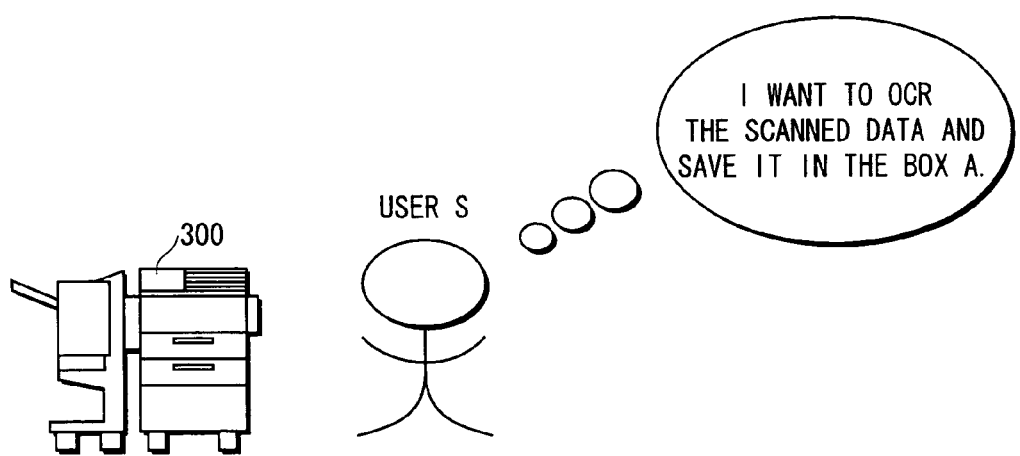
FIG. 19 shows a user S standing in front of the MFP 300, and the user's wish.

FIG. 19 shows a user S standing in front of the MFP 300, and the user's wish.

As an example of the workflow generation support method, the following describes a process in which the user S, who is not familiar with generating workflows, completes the workflow generation by operating the operation panel of the MFP 300 with a support by the workflow server 400.

Figure 20:
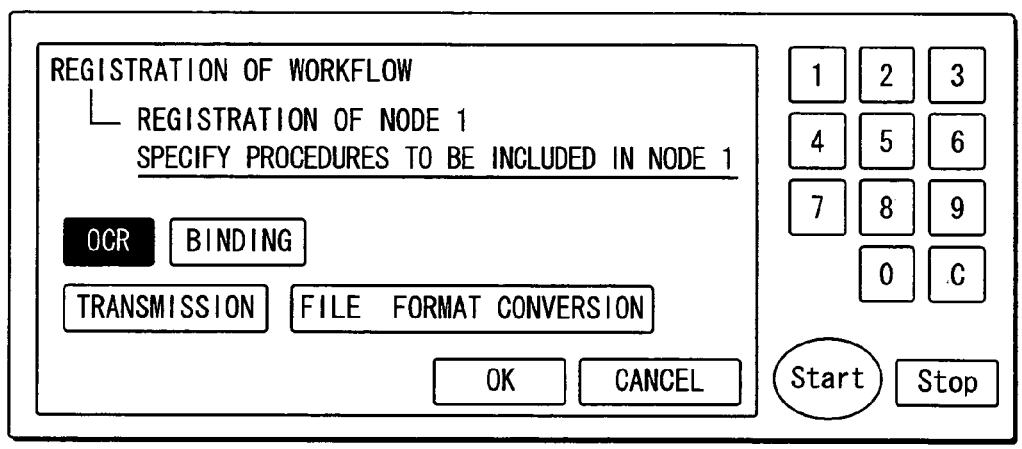
FIG. 20 shows an operation panel unit of an MFP 300, which displays a screen used for generating a workflow.

FIG. 20 shows an operation panel unit of an MFP 300, displaying one screen used for generating a workflow. FIG. 21 shows details of a workflow generated by the user S using an operation panel unit of the MFP 300.

The MFP 300 has almost the same structure as the MFP 200 (see FIG. 10 and FIG. 11). Therefore, the description is omitted here.

As FIG. 21 shows, the "device name" of the device that performs the "OCR" procedure included in the node 1 (which is to be firstly performed) is "not specified". (The user S did not know which device can perform the OCR procedure.) The criterion (A) is true in this case, where the part of the node definition information is missing. Accordingly, the workflow server 400 judges that the node 1 is incomplete.

Regarding the "transmission" procedure included in the node 2, "BOX A" is specified by the user S as the "destination". As to the workflow server 400, the predetermined rule relating to the criterion (C) provides that the document file to be stored in the BOX should be a PDF (Portable Document Format) file. Accordingly the workflow server 400 judges that the node 2 is incomplete as well. Here, the PDF is used as the storage format because of its general versatility, which means that the file is reusable.

The procedure included in the incomplete node "node 1" is the "OCR" procedure. The workflow server 400 searches the node classification table 422 for the node whose classification name is "OCR". The workflow server 400 refers to the entries whose classification names are "OCR1" and "OCR2", and displays a screen showing candidates of the device names from which the user would complement the incomplete part.

Figure 22:
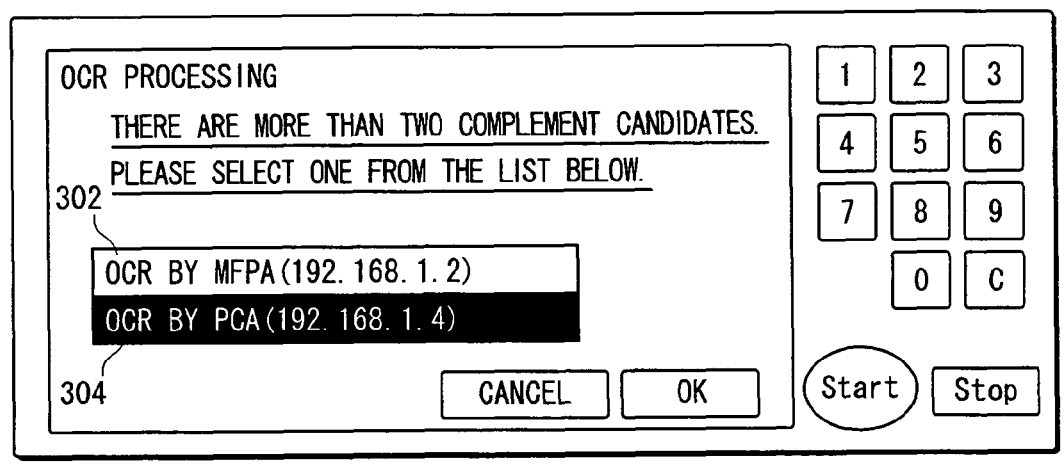
FIG. 22 shows a screen used for selecting a procedure from complement candidates displayed on an operation panel unit.

FIG. 22 shows the screen used for selecting the complement candidates displayed on the operation panel unit.

As FIG. 22 shows, selection keys 302 and 304 are displayed in the screen. The selection keys represent the candidates of the devices that can perform the OCR procedure included in the node 1, and the user can select one of the selection keys 302 and 304 by pressing down.

Unlike in the case of setting the configuration values in the first and the second embodiments, it is preferable that the workflow is generated manually by the user, going through some phases of selections and confirmations, instead of being generated automatically. This is because if the workflow is generated automatically, an improper workflow which causes a malfunction in the device and a workflow which is not intended by the user might be generated.

The node 2 is also judged as incomplete because the criterion (C) is true as to the node 2. Therefore, the workflow server 600 searches the node classification table 422 for a node which can handle the "PDF" format. The workflow server 400 refers to entries whose classification names are respectively "file type conversion 1" and "file type conversion 2", which include the "PDF" in their respective procedure information. In the same manner as FIG. 22, the selection screen for selecting one of the candidates is displayed (not illustrated).

Figure 23:
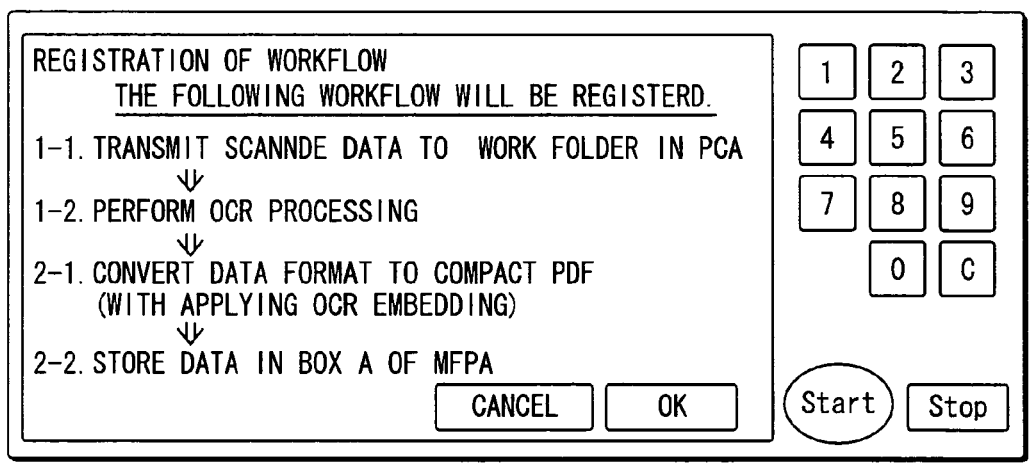
FIG. 23 shows a confirmation screen displaying a completed workflow to a user.
Figure 24:
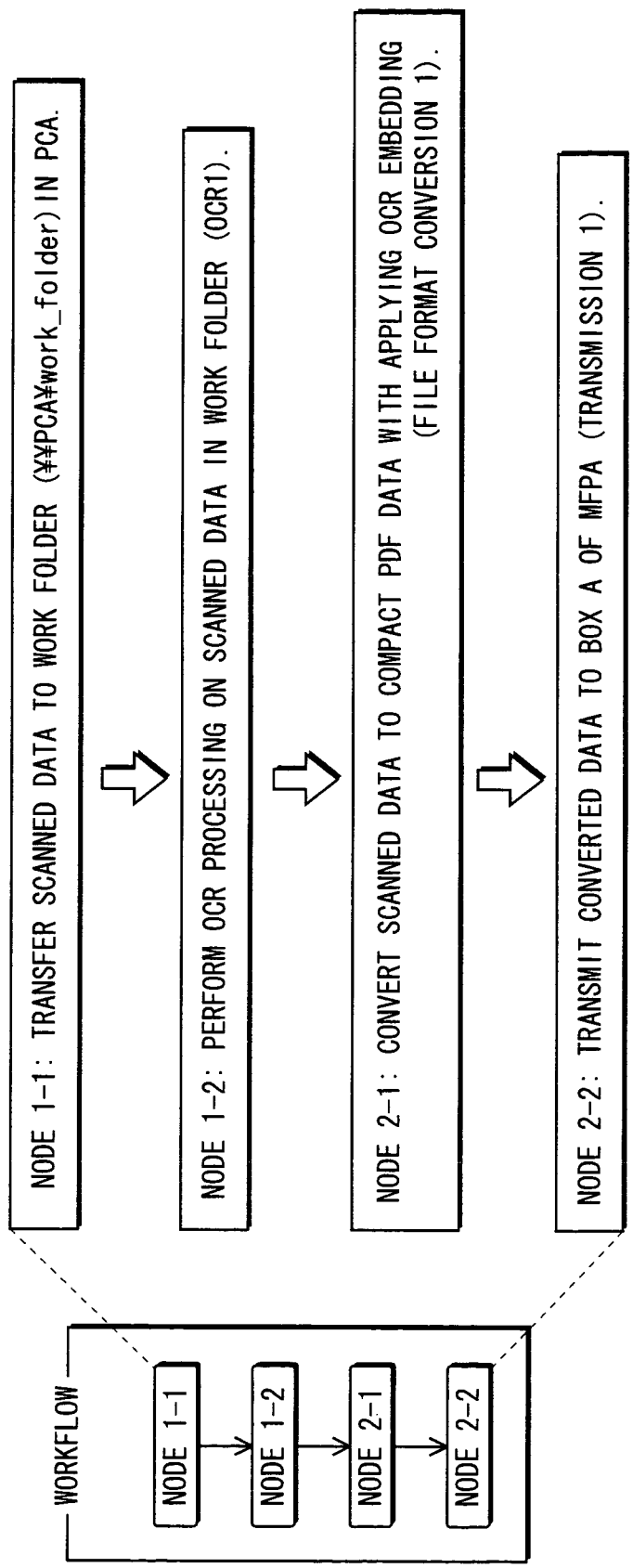
FIG. 24 shows a completed workflow.

FIG. 23 shows a confirmation screen displaying a completed workflow to a user, and FIG. 24 shows the completed workflow.

Figure 25:
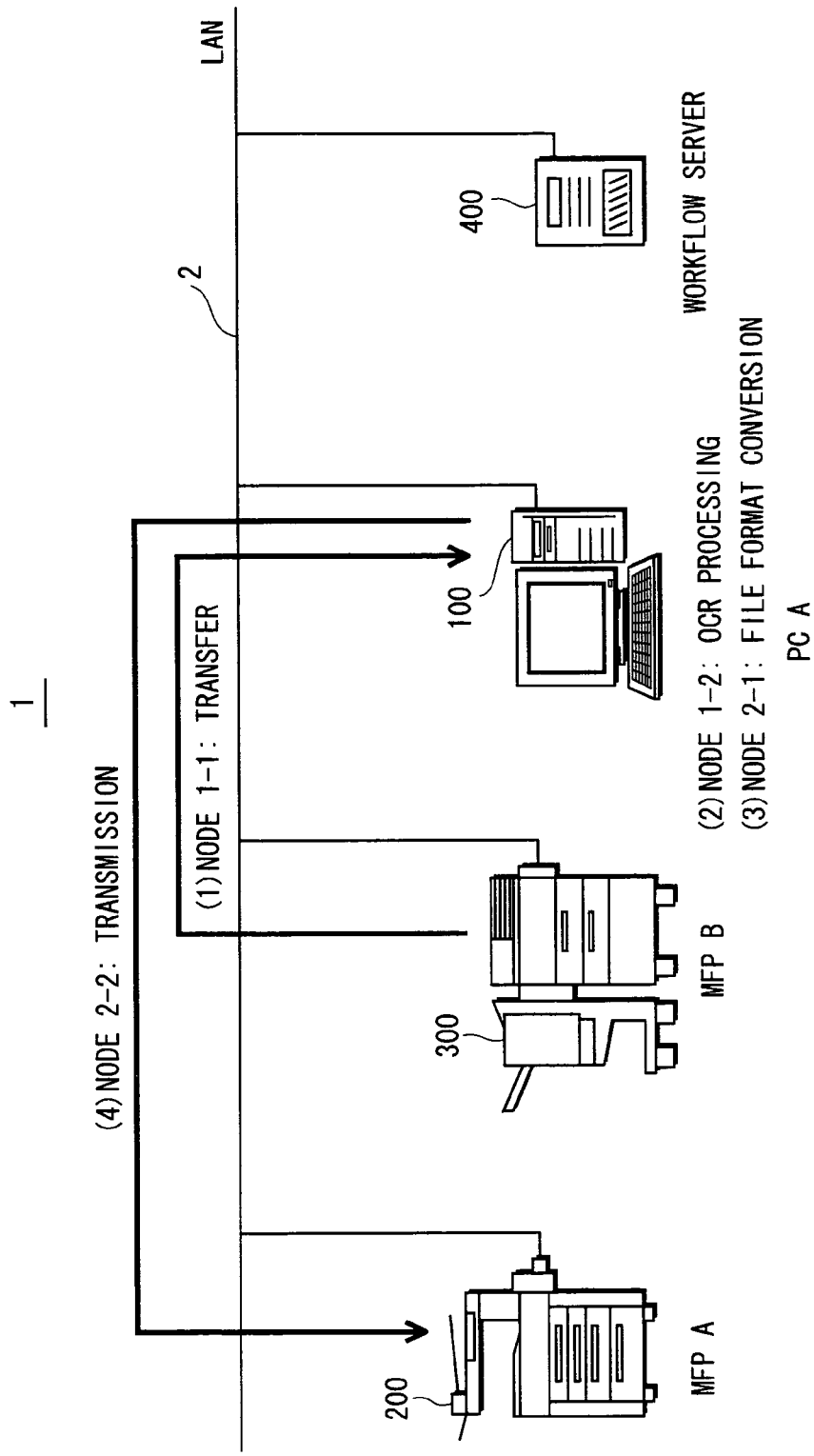
FIG. 25 shows a workflow including a flow of data (a document file) scanned by an MFP B.

FIG. 25 shows the flow of data as a document file scanned by the MFP B, and the completed workflow.

The node 1 received from the user S is divided into a node 1-1 and a node 1-2.

The node 1-1 is for transferring the scanned document file from the MFP 300 (MFP B), where the scanned document file exists when the workflow starts, to the PC 100 (PC A).

The node 2 received from the user S is divided into a node 2-1 and 2-2.

As described above, in the third embodiment, the workflow server 400 can generate the workflow by complementing each node received from the user, even if the node, which has been received from the user, is not fully defined. Also, the node definitions of the existing workflows can be inherited as the node definitions of the new workflow. Therefore, this lightens the burden on the user who generates the new workflow. Furthermore, the embodiment can enable the user who is not familiar with workflows to newly generate workflows.

Modifications (1) Similar Applications

Although not described in detail in the first embodiment, the types of the applications (see FIG. 4) may be more roughly classified. For instance, applications having similar configuration files (i.e. the configuration files bear a similarity) may be classified into the same type.

(2) Degree of Agreement between Models

In the first embodiment, the intra-LAN search and selection procedure (see FIG. 7) is for searching the existing devices for a device whose model is the same as the model that the new application supports. However, the intra-LAN search may be performed for searching a device whose degree of agreement between the models is high among the existing devices, even if the model is not exactly the same.

More specifically, devices whose degree of agreement is high as to model attributes, such as (A) Color/Monochrome, (B) Segment, (C) MFP/FAX/Printer/Copier, (D) Manufacturer, and (E) Department which purchased the device, may be searched for.

An existing application whose degree of agreement with new application is high as to (A) to (E) generally has many similarities in the configuration files. Therefore, there is a possibility that some of the configuration items can be inherited by the new application.

(3) Selection Conditions

In the first embodiment, if the plurality of applications are found by the search, the control unit 160 selects one of the applications by (A) judging whether the default configuration is prepared and (B) comparing the versions. Here, (A) and (B) are performed individually. However, the selection may be performed comprehensively. In other words, a weight may be assigned to each result of (A) and (B), and the selection may be performed based the weight.

The object of the application selection is to select an existing application that is supposed to have been used by the user regularly. Therefore, any method that achieves the object may be used for the application selection. For instance, it may be performed by comparing the generation date, the access date and the update date of the configuration file, and the number of times that the applications are used.

(4) Configuration File

In the first and the second embodiments, it is described that the configuration file exists for each application. However, the present invention is applicable to an application that uses a file (registry) for collectively managing the configuration files.

(5) Registration Failure

Figure 26:
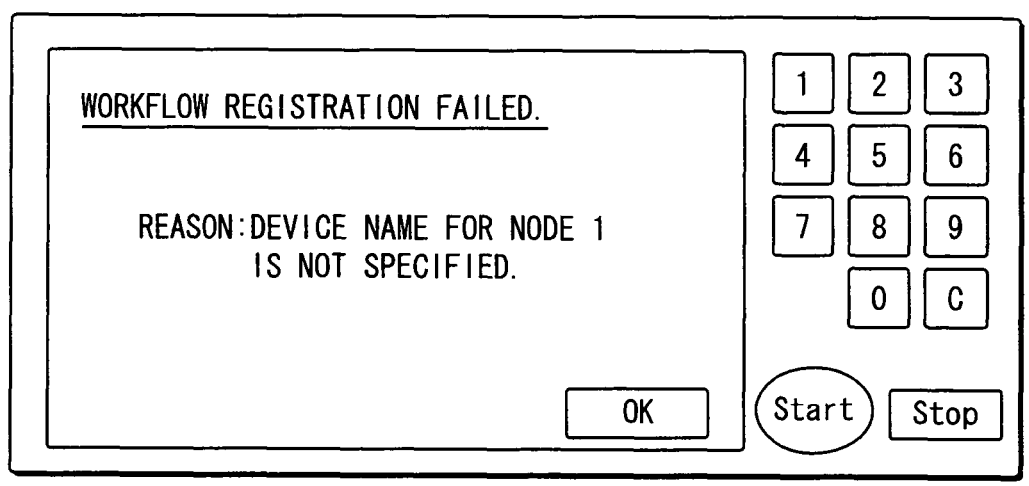
FIG. 26 shows a screen showing that a registration of a workflow failed.

FIG. 26 is a screen showing a registration failure caused in Step S207 of the procedure for generating the workflow definition (see FIG. 18).

(6) In the third embodiment, in the same manner as the first and the second embodiments, if the device that should perform the procedure is not specified, the devices existing within the LAN may be searched for instead of using the existing nodes.

(7) Programs

The installation support method and the workflow generation support method according to the present invention can be realized by an installation support program and a workflow generation support program. Such programs may be recorded on a magnetic tape, a magnetic disk (e.g. a flexible disk), an optical recording medium (e.g. a DVD, a CD-ROM, a CD-R, and an MO), a flash memory (e.g. a Smart Media™ and a compact Flash™), or another computer-readable recording medium. The programs may be produced and transferred as such a recording medium on which the programs are recorded, or may be transmitted and provided via wired or wireless networks including the Internet. The program may also be transmitted and provided via broadcasting, a telecommunication network, a satellite communication network or the like.

(8) Packaged with Programs

In the first embodiment, the configuration values are obtained and set after the installation of the new application is finished. However, the installation support program may be packaged with an installer of the new application so that the configuration values are obtained and set during the installation of the new application. Also, the configuration values may be obtained and set just before the installation of the new application starts.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A workflow generation support method that supports a generation of a workflow including nodes, the workflow performing a plurality of procedures, the method comprising:
a receiving step of receiving, from a user, a definition of a new node which is to be included in the workflow;
wherein the received definition of each node includes a procedure ID relating to the node, the procedure ID representing at least one of the plurality of procedures;
a judging step of judging whether the received definition is complete;
in response to receiving a result that the received definition is incomplete from the judging step, a searching step of searching a storing unit for stored nodes which have been previously generated for a node whose definition relates to the new node; and
a complementing step of obtaining the definition of the node found by the search, and complementing an incomplete part of the received definition using the obtained definition;
wherein the complementing step divides the incomplete part of the received definition into two nodes.

2. The workflow generation support method of claim 1, further comprising a selecting step of displaying candidate nodes to the user if a plurality of nodes are found by the search, and receiving an instruction from the user to select one of the candidate nodes.

3. The workflow generation support method of claim 1, wherein the definition of each node includes a procedure ID relating to the node and a device ID used for identifying the device that performs a procedure included in the node, and the judging step judges that the received definition is incomplete if the device ID is not specified by the user or the device is not capable of performing the procedure.

4. The workflow generation support method of claim 3, wherein the workflow is for processing a document while transferring the document among a plurality of devices connected together via a network, the searching step searches for a node whose procedure ID is the same as the procedure ID of the new node, and the complementing step adds, to the definition of the found node, a definition of a transfer node, which is used for transferring the document to the device identified by the device ID.

5. The workflow generation support method of claim 1, wherein the workflow is generated for processing a document while transferring the document among a plurality of devices connected together via a network, and the judging step judges that the received definition is incomplete if the definition is not in conformity with a predetermined rule.

6. The workflow generation support method of claim 1, wherein the plurality of procedures performed by the workflow are linked for processing a document.

7. The workflow generation support method of claim 1, wherein the plurality of procedures comprises scanning, faxing, and data transmission among devices.

8. The workflow generation support method of claim 1, wherein the judging step of judging whether the received definition is complete includes judging whether the received definition specifies a device for performing the procedure represented by the procedure ID.

9. The workflow generation support method of claim 8, wherein the judging step of judging whether the received definition is complete includes judging whether the device specified in the received definition is capable of performing the procedure represented by the procedure ID.

10. The workflow generation support method of claim 5, wherein when the judging step judges the received definition is not in conformity with the predetermined rule, the received definition is modified to conform to the predetermined rule.

* * * * *